(12) United States Patent
Yang

(10) Patent No.: US 6,658,274 B1
(45) Date of Patent: Dec. 2, 2003

(54) CELLULAR PHONE VOICE INTERFACE STRUCTURE

(76) Inventor: Tai-Her Yang, No. 59, Chung Hsing B St., Si-Hu Town, Dzan-Hwa (TW)

( * ) Notice: Subject to any disclaimer, the term of this patent is extended or adjusted under 35 U.S.C. 154(b) by 433 days.

(21) Appl. No.: 09/635,242

(22) Filed: Aug. 9, 2000

Related U.S. Application Data

(63) Continuation-in-part of application No. 09/543,344, filed on Apr. 5, 2000.

(51) Int. Cl.⁷ ................................................. H04M 1/00
(52) U.S. Cl. ..................... 455/575.1; 455/550; 455/569; 455/567; 379/433.02; 379/433.03; 379/433.06; 381/74; 381/79; 381/80; 381/85; 381/122
(58) Field of Search .......................... 455/550, 90, 569, 455/567, 575; 379/433.02, 433.03, 110.01, 433.06; 381/74, 79, 80, 85, 122

(56) References Cited

U.S. PATENT DOCUMENTS

| | | | | | |
|---|---|---|---|---|---|
| 5,610,971 | A | * | 3/1997 | Vandivier | 455/569 |
| 6,389,297 | B1 | * | 5/2002 | Attimont et al. | 455/550 |
| 6,397,085 | B1 | * | 5/2002 | Okagaki et al. | 455/567 |
| 6,434,407 | B1 | * | 8/2002 | Cook | 455/569.1 |

* cited by examiner

Primary Examiner—William Trost
Assistant Examiner—Danh Le
(74) Attorney, Agent, or Firm—Bacon & Thomas, PLLC

(57) ABSTRACT

A voice interface structure for a cellular phone that permits two-way operation or can be provided at where opposite to the keypad of the cellular phone, wherein, both of the voice interface and control keypad are arranged in two-ways or facing away from each other so that when the keypad control and operation. as well as the use of the voice interface, the case of the cellular phone is used as a screen to reduce the electromagnetic wave the head of the user is exposed to without compromising the convenience of key entering and executing of transmission and receiving.

8 Claims, 28 Drawing Sheets

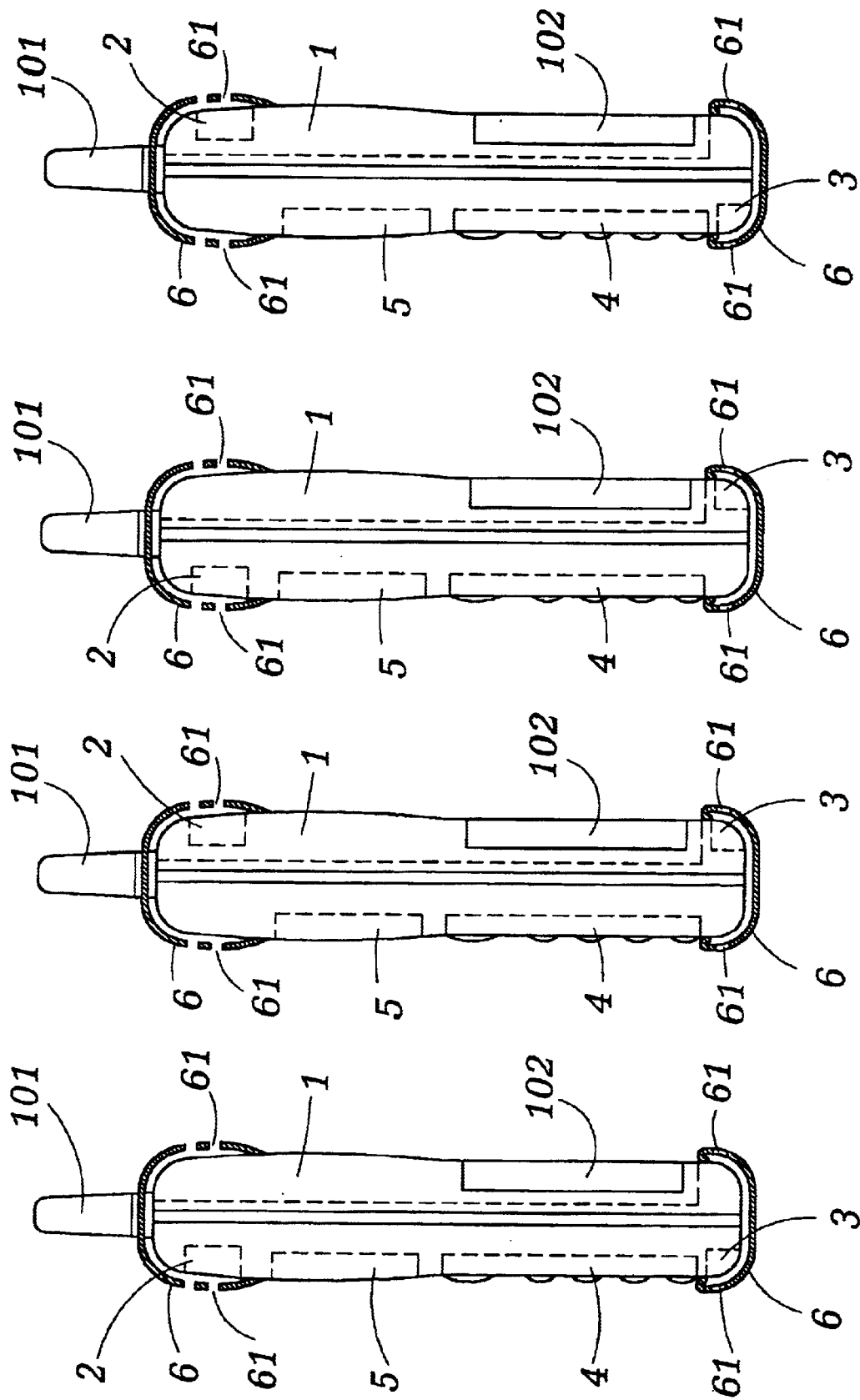

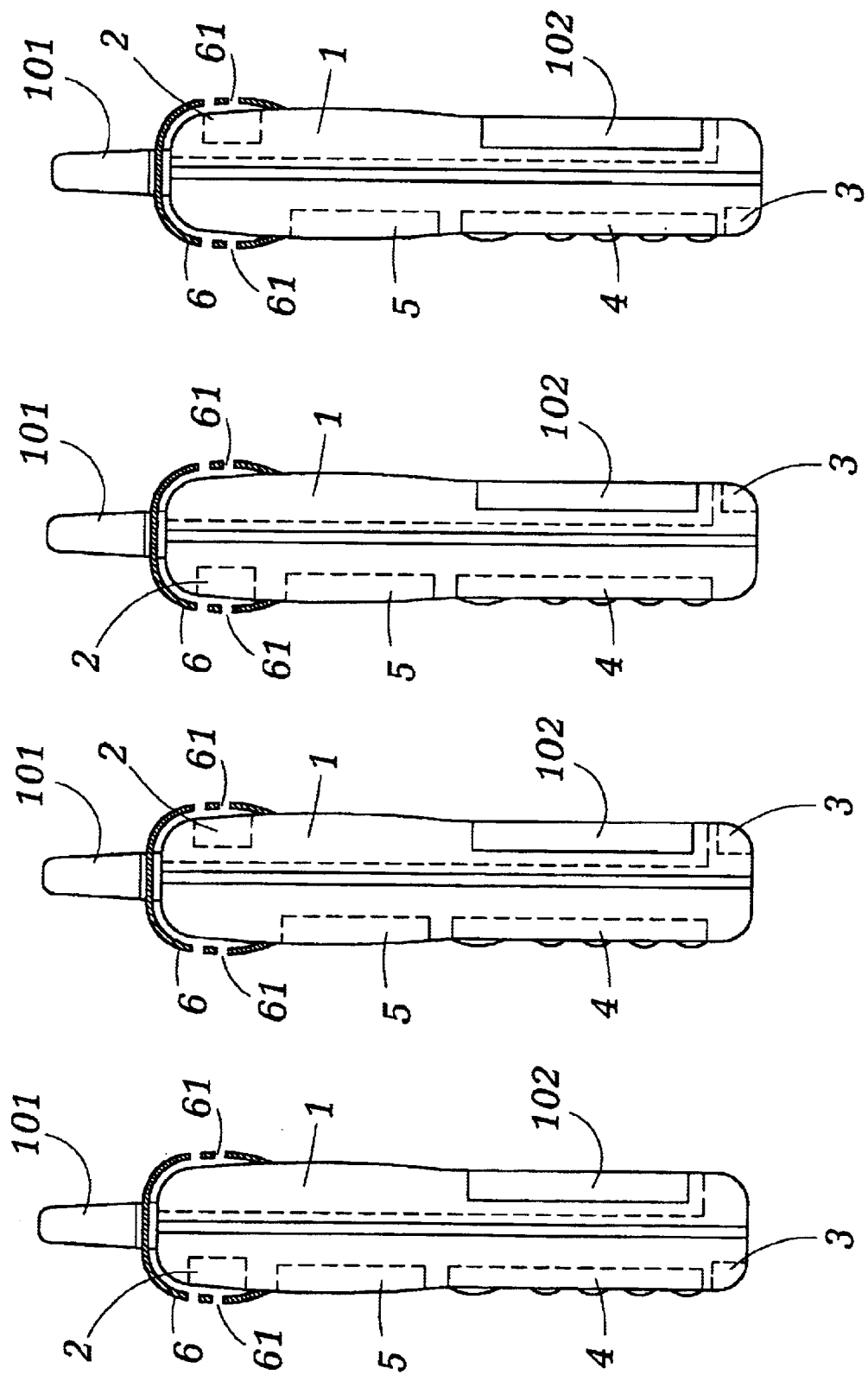

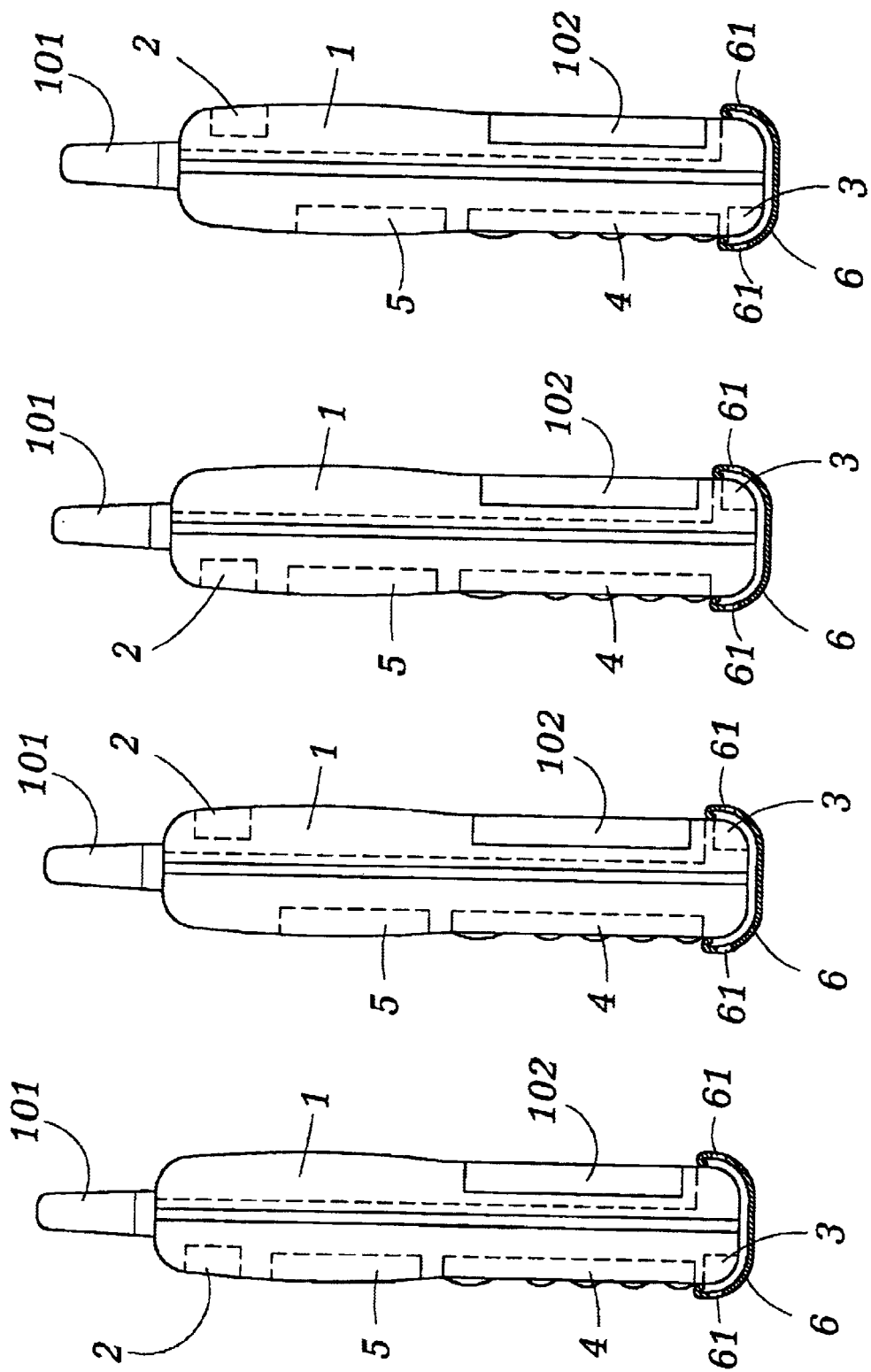

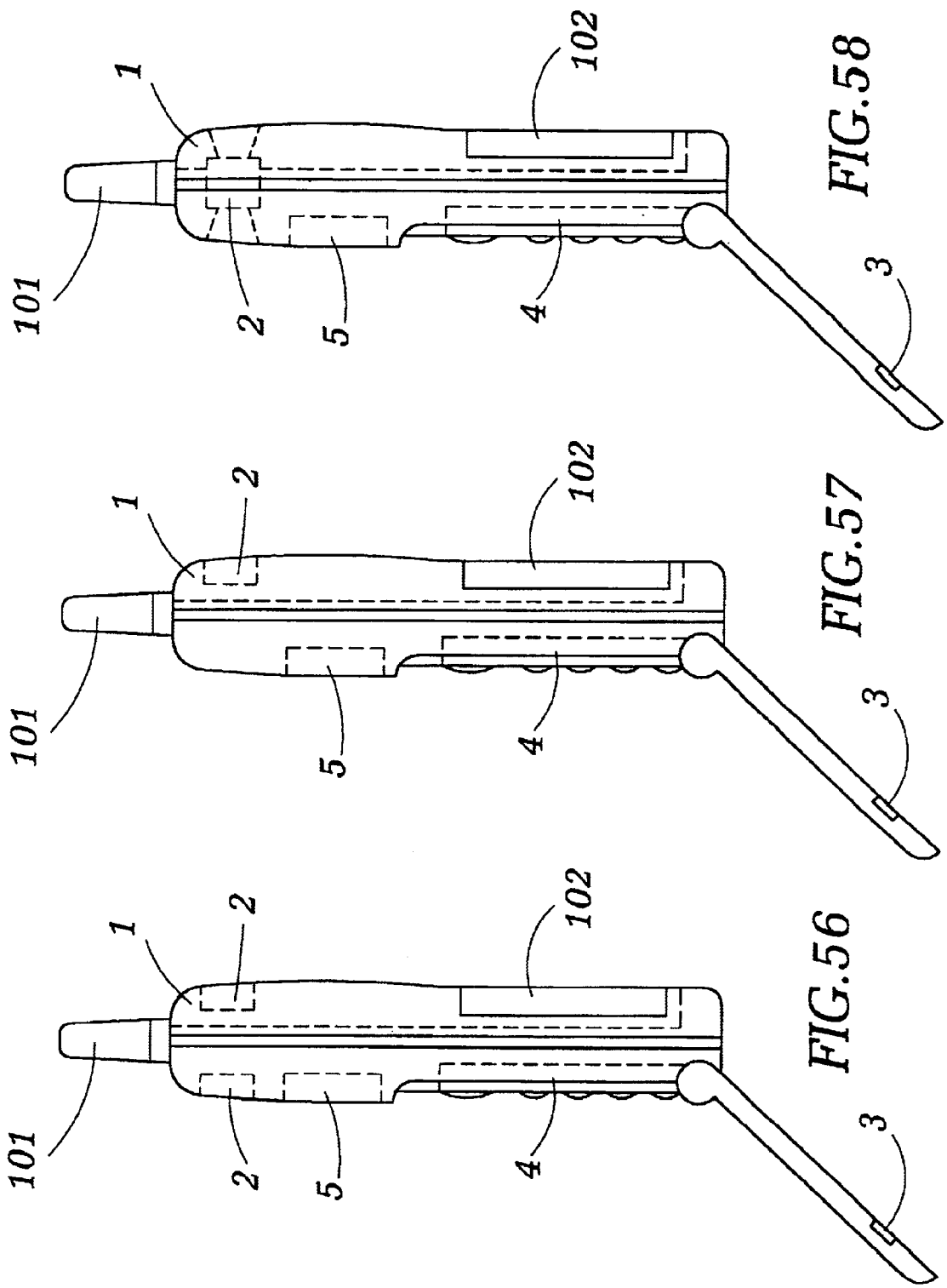

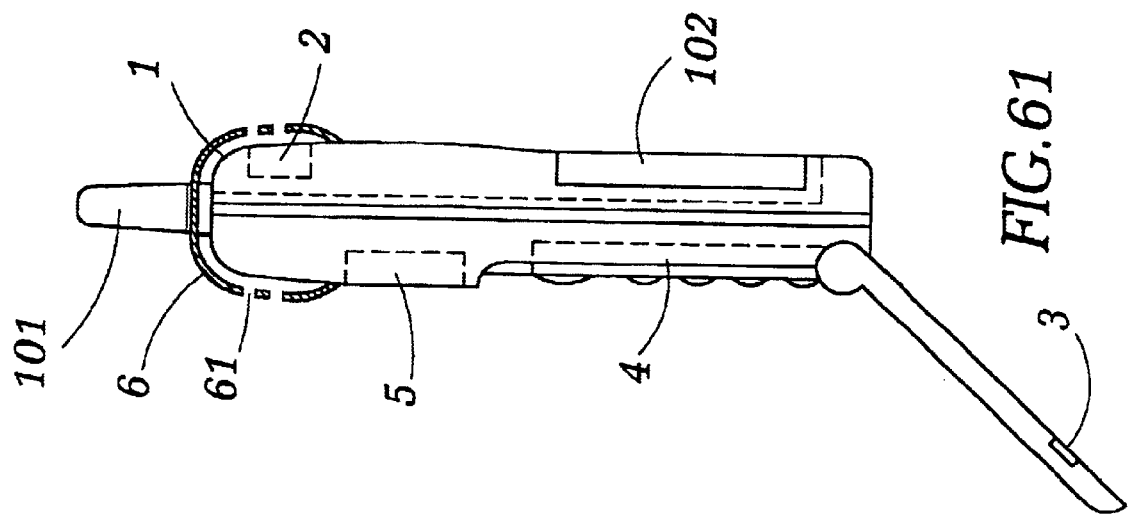
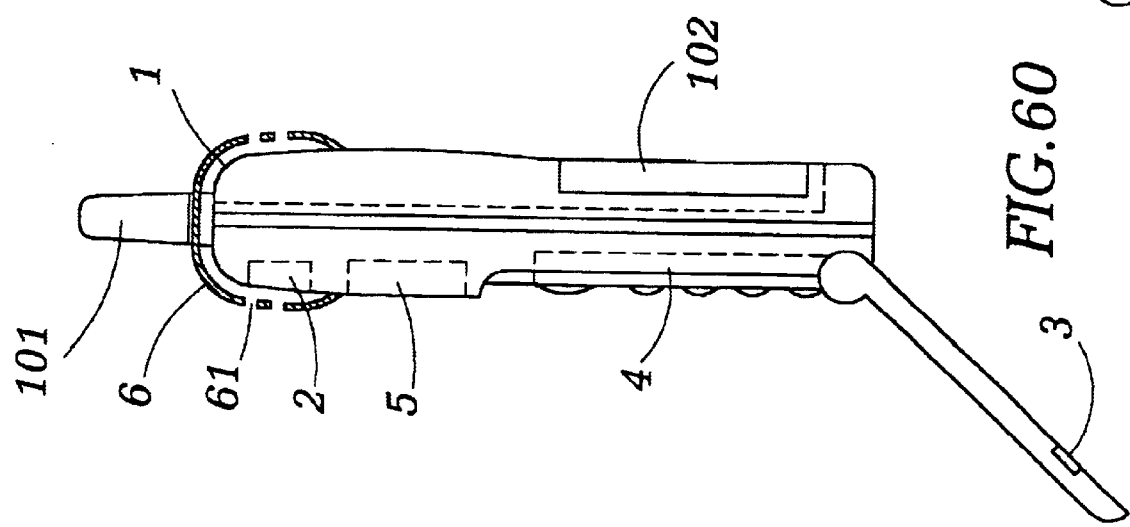
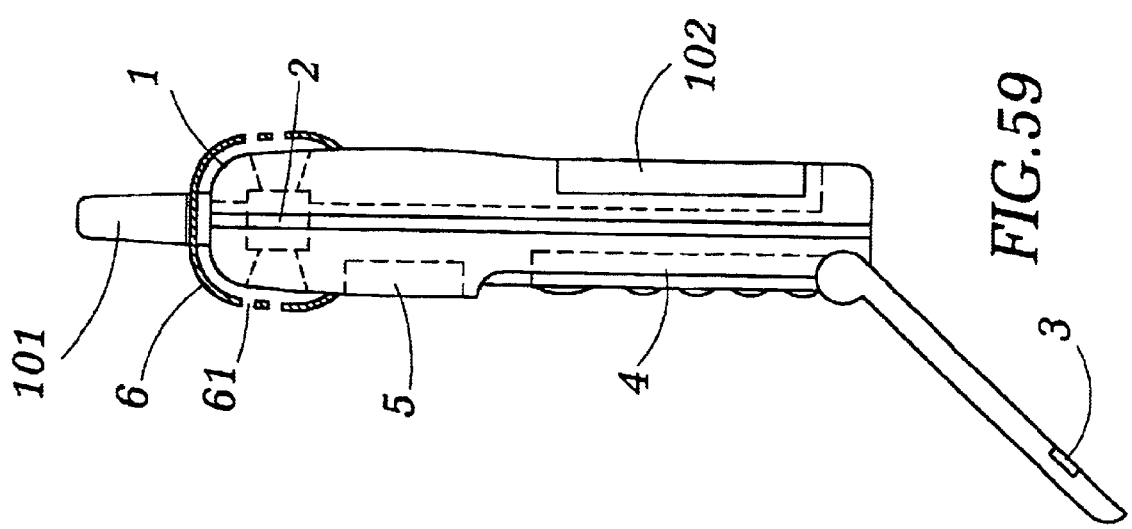

CELLULAR PHONE VOICE INTERFACE STRUCTURE

This application is a continuation-in-part of application Ser. No. 09,543,344 filed Apr. 5, 2000.

BACKGROUND OF THE INVENTION a) Field of the Invention

The present invention relates to a structure of cellular voice interface, and more particularly, to one that allows 2-way operation or that can be provided at where opposite to keypad of the cellular phone case, so to reduce the strength of electromagnetic wave the head of the user is exposed to while using the tone interface by having the case as a screen without compromising the operation convenience of key entering and executing hand-held for transmission and receiving with the ear and mouth of the user.

(b) Description of the Prior Art:

As illustrated in FIGS. 1, 2 and 3, the layout of the prior art of a cellular phone usually is comprised of a horn 20 for voice signal output, a microphone 30 as the voice signal input, and a control keypad 40 all arranged on the same side of the case 10 of the cellular phone. However, spacing exists among the keypad 40, a display 50 and the case 10, during transmitting/receiving voice signals, the head of the user is exposed to the direct emission of electromagnetic wave through such spacing, thus to cause hazards to the health of the user.

SUMMARY OF THE INVENTION

The primary purpose of the present invention is to provide a cellular telephone structure, within, a tone interface and a control keypad indicating 2-way or are arranged facing away from each other; so that when the tone interface provided at where opposite to the control keypad, the case provides a screen to reduce the strength of electromagnetic wave the head of the user is exposed without compromising the convenience of key entering to execute/hand-held for transmission and receiving with the ear and mouth of the user.

BRIEF DESCRIPTION OF THE DRAWINGS

FIG. 25 is a side view of the twentieth preferred embodiment of the present invention.

FIG. 26 is a side view of the twenty-first preferred embodiment of the present invention.

FIG. 27 is a side view of the twenty-second preferred embodiment of the present invention.

FIG. 28 is a side view of the twenty-third preferred embodiment of the present invention.

FIG. 29-1 is a view showing the first preferred embodiment of the present invention, wherein a voice conduction pore is provided only on the rear case.

FIG. 29-2 is a view showing the second preferred embodiment of the present invention, wherein a voice conduction pore is provided only on the rear case.

FIG. 29-3 is a view showing the third preferred embodiment of the present invention, wherein a voice conduction pore is provided only on the rear case.

FIG. 29-4 is a view showing the fourth preferred embodiment of the present invention, wherein a voice conduction pore is provided only on the rear case.

FIG. 29-5 is a view showing the fifth preferred embodiment of the present invention, wherein a voice conduction pore is provided only on the rear case.

FIG. 29-6 is a view showing the sixth preferred embodiment of the present invention, wherein a voice conduction pore is provided only on the rear case.

FIG. 31 is a side view of the twenty-fourth preferred embodiment of the present invention.

FIG. 32 is a side view of the twenty-fifth preferred embodiment of the present invention.

FIG. 33 is a side view of the twenty-sixth preferred embodiment of the present invention.

FIG. 34 is a side view of the twenty-seventh preferred embodiment of the present invention.

FIG. 41 is a side view of the thirty-third preferred embodiment of the present invention.

FIG. 42 is a side view of the thirty-fourth preferred embodiment of the present invention.

FIG. 43 is a side view of the thirty-fifth preferred embodiment of the present invention.

FIG. 44 is a side view of the thirty-sixth preferred embodiment of the present invention.

FIG. 56 is a side view of the forty-eighth preferred embodiment of the present invention.

FIG. 57 is a side view of the forty-ninth preferred embodiment of the present invention.

FIG. 58 is a side view of the fiftieth preferred embodiment of the present invention.

FIG. 59 is a side view of the fifty-first preferred embodiment of the present invention.

FIG. 60 is a side view of the fifty-second preferred embodiment of the present invention.

FIG. 61 is a side view of the fifty-third preferred embodiment of the present invention.

DETAILED DESCRIPTION OF THE PREFERRED EMBODIMENTS

Figure 3:
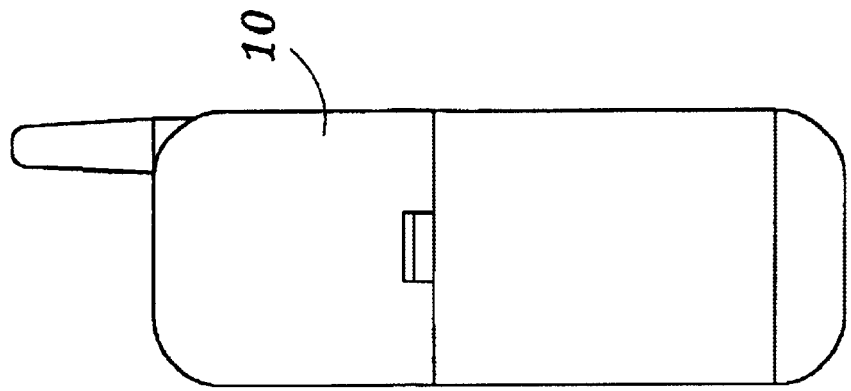
FIG. 3 is a rear view of the prior art of the cellular phone.
Figure 2:
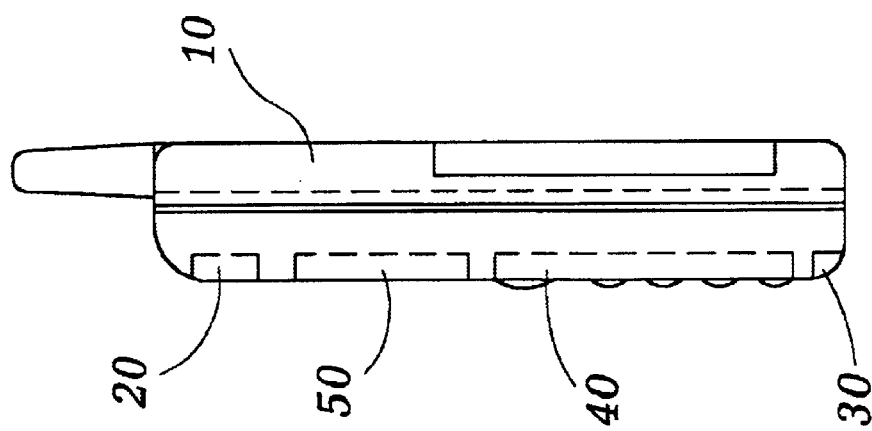
FIG. 2 is aside view of the prior art of the cellular phone.
Figure 6:
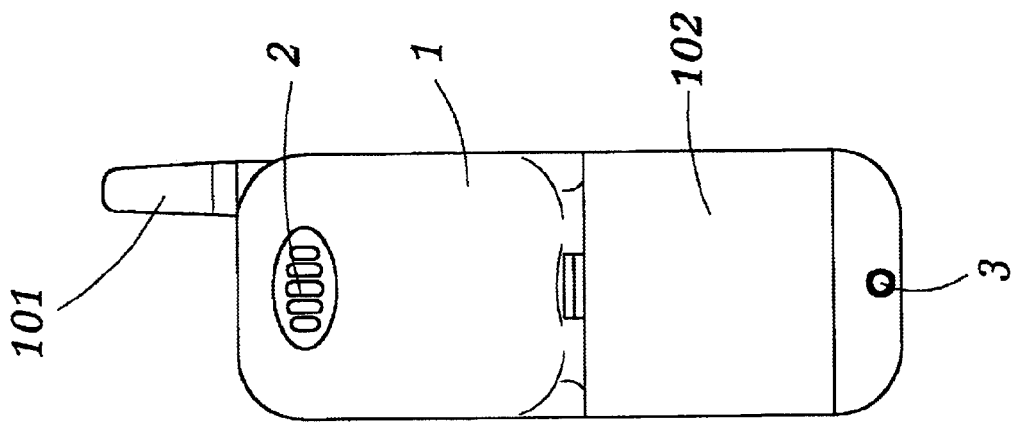
FIG. 6 is a rear view of the first preferred embodiment of the present invention.
Figure 4:
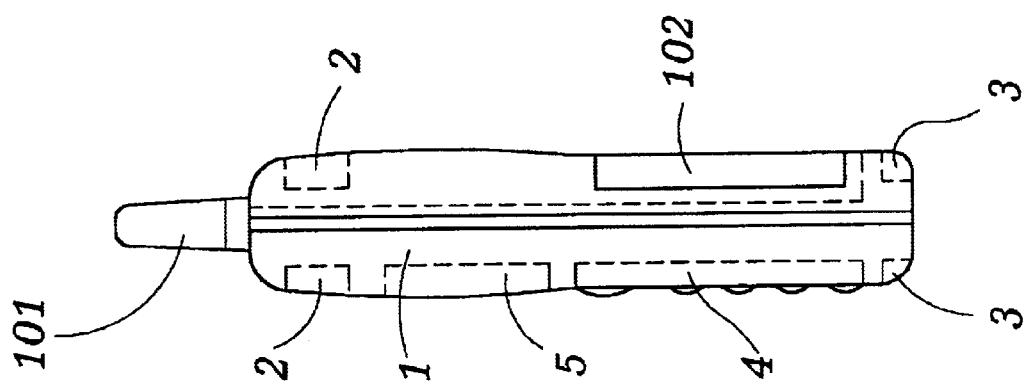
FIG. 4 is a front view of the first preferred embodiment of the present invention.
Figure 5:
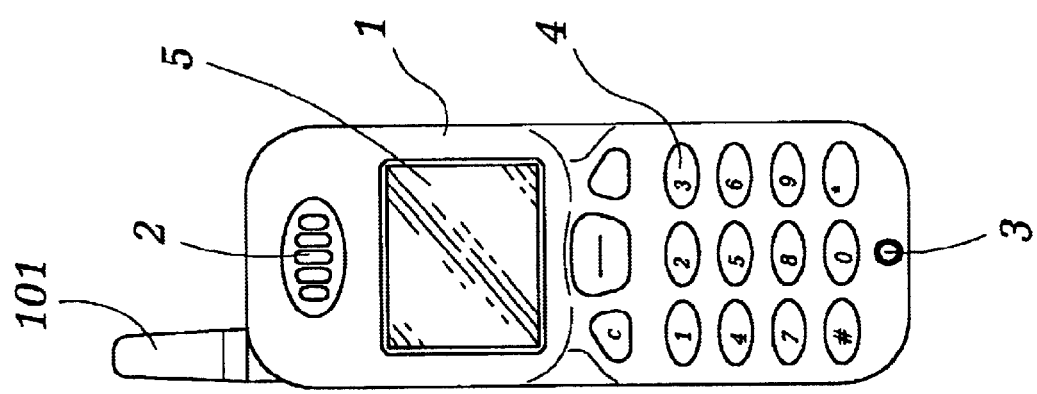
FIG. 5 is a side view of the first preferred embodiment of the present invention.
Figure 7:
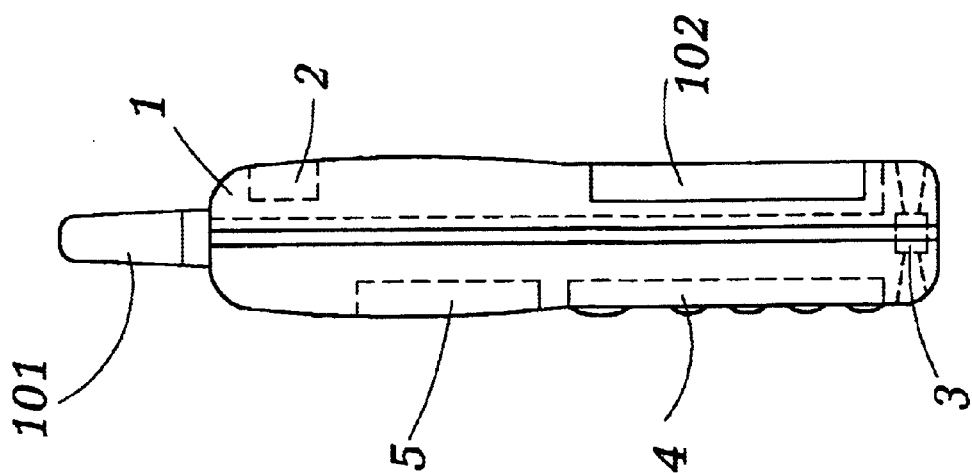
FIG. 7 is a front view of the second preferred embodiment of the present invention.
Figure 8:
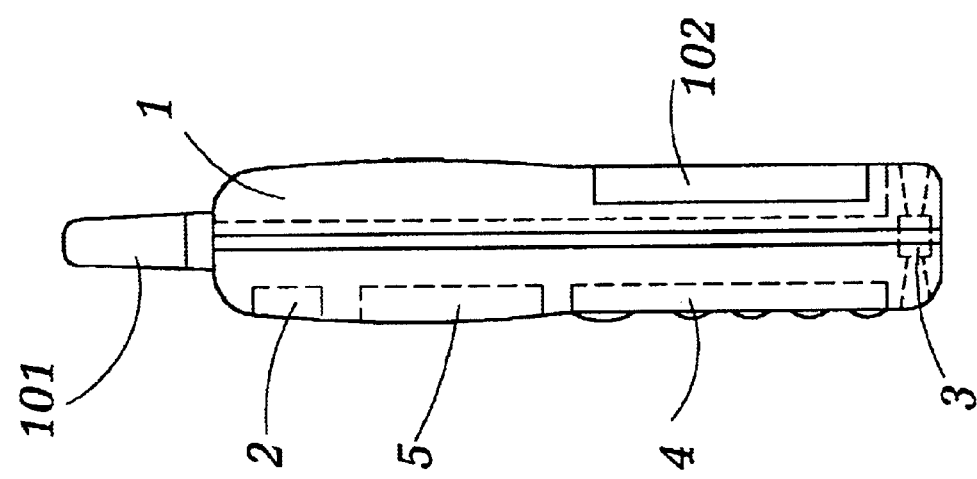
FIG. 8 is a side view of the third preferred embodiment of the present invention.
Figure 9:
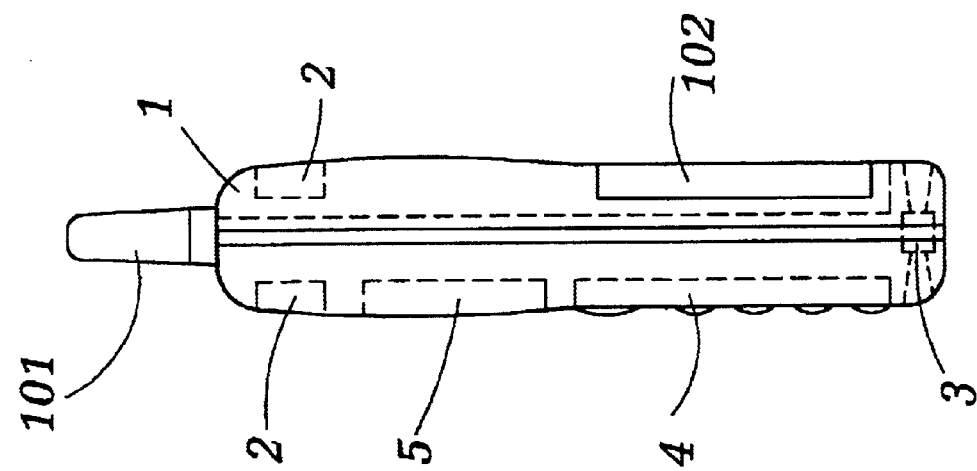
FIG. 9 is a rear view of the fourth preferred embodiment of the present invention.
Figure 10:
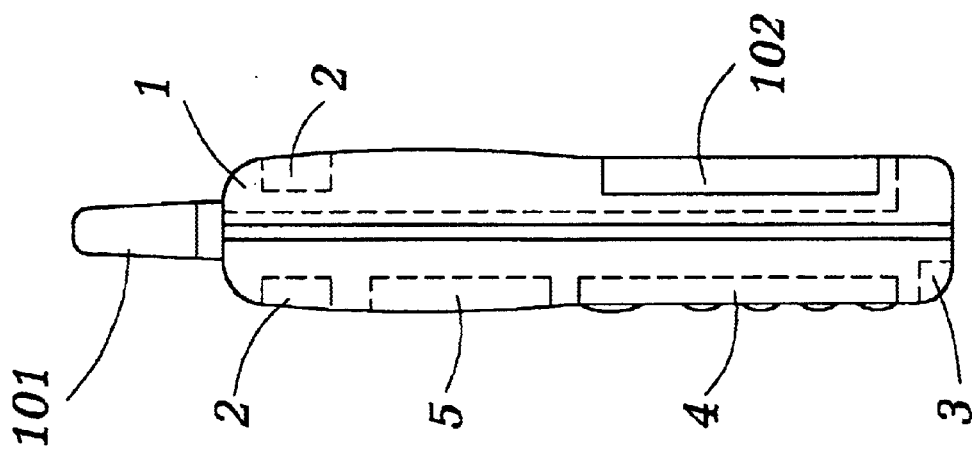
FIG. 10 is a side view of the fifth preferred embodiment of the present invention.
Figure 11:
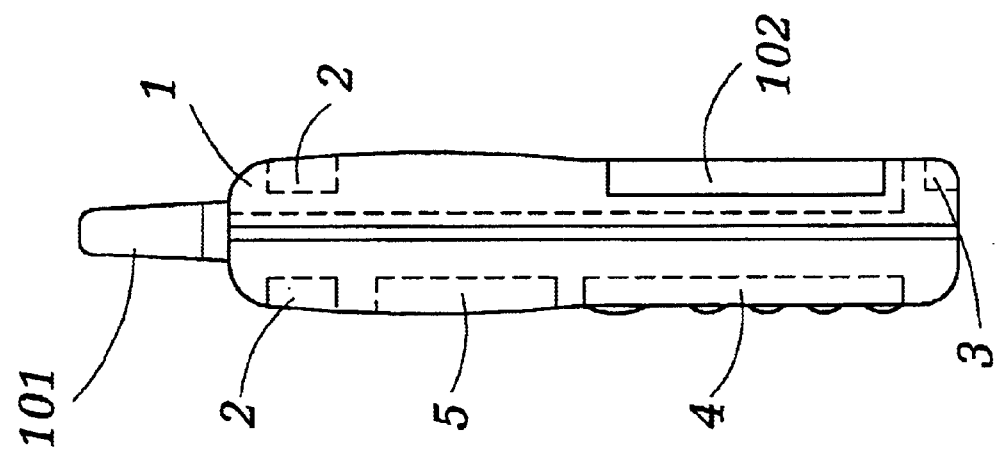
FIG. 11 is a side view of the sixth preferred embodiment of the present invention.
Figure 12:
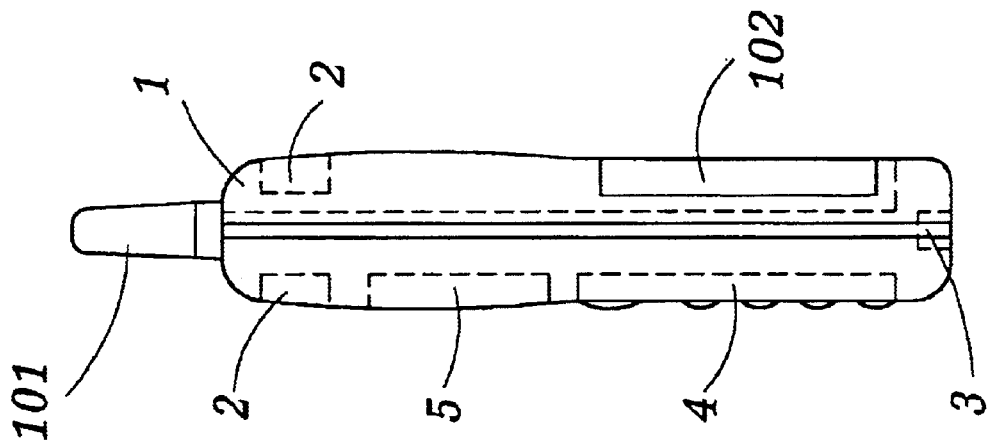
FIG. 12 is a side view of the seventh preferred embodiment of the present invention.
Figure 13:
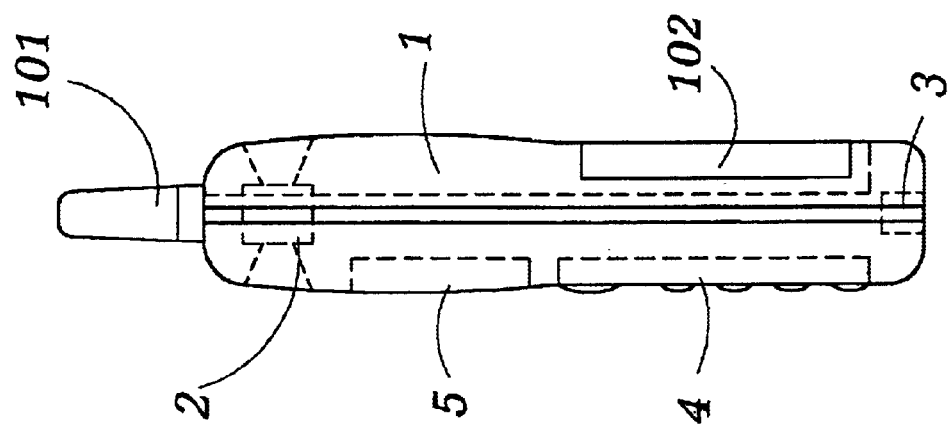
FIG. 13 is a side view of the eighth preferred embodiment of the present invention.
Figure 14:
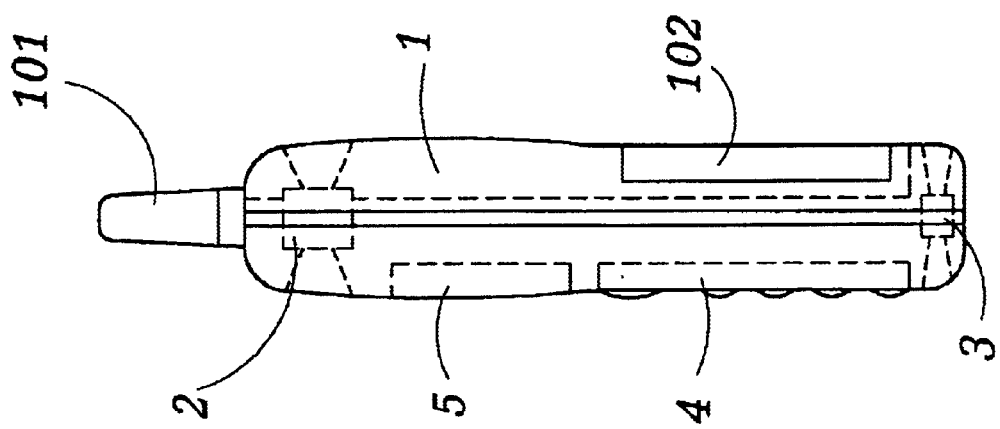
FIG. 14 is a side view of the ninth preferred embodiment of the present invention.
Figure 15:
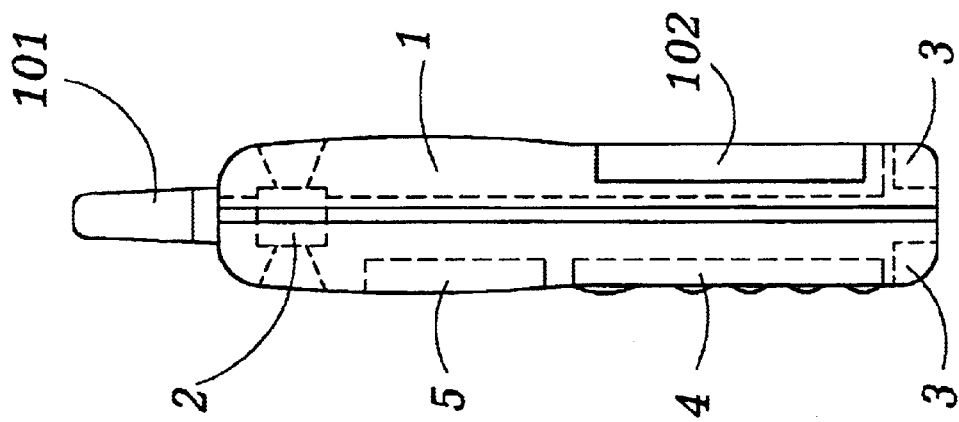
FIG. 15 is a side view of the tenth preferred embodiment of the present invention.
Figure 16:
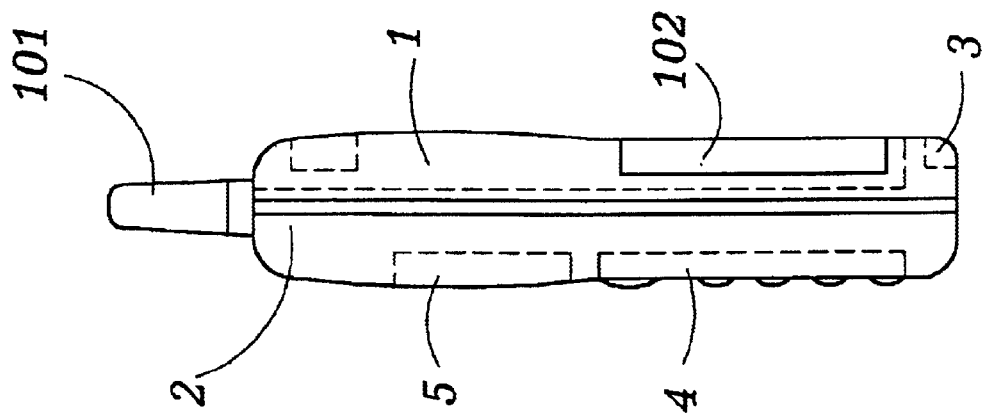
FIG. 16 is a side view of the eleventh preferred embodiment of the present invention.
Figure 17:
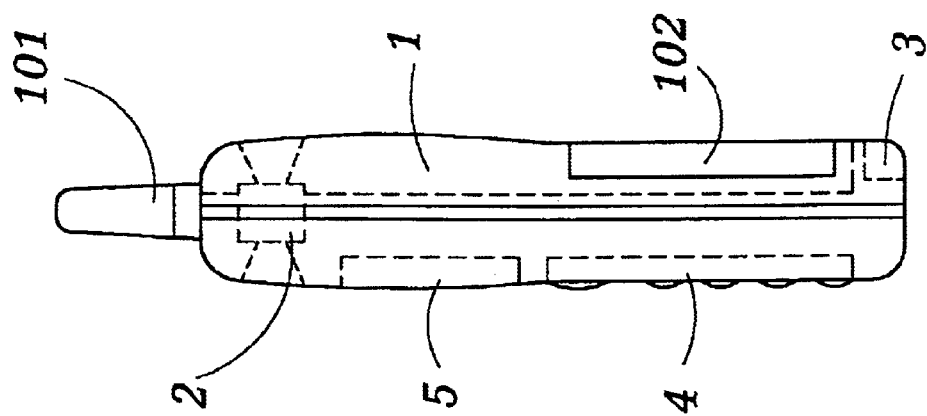
FIG. 17 is a side view of the twelfth preferred embodiment of the present invention.

A structure of a cellular phone voice interface that allows two-way operation or is arranged opposite to the keypad disclosed in the present invention is essentially comprised of a cellular phone case 1, a horn 2, a microphone 3, a keypad 4, and a display 5. Within, said case 1 at pre-selected position is provided with an external or built-in antenna 101 and a cell 102. The structure that allows 2-way operation includes:

(1) An individual horn 2 and an individual microphone 3 are provided in the front and in the rear of the case 1 of the cellular phone; the first preferred embodiment of the present invention as illustrated in FIGS. 4, 5 and 6 is characterized by that the independent horn 2 and the independent microphone 3 are provided in the front, and also in the rear of the case 1;

(2) An individual horn and common microphone 3 are simultaneously or respectively provided in the front and the rear of the case 1 of the cellular phone, and both horns 2 and the microphone 3 are coupled at an internal voice conduction structure extending toward the front and the rear of the case 1 as illustrated in FIG. 7; the third preferred embodiment of the present invention is characterized by that the independent horn 2 is each provided at the same time in the front and the rear of the case 1, and a common microphone 3 is provided at a pre-selected position on the case 1 with said common microphone 3 coupled to the internal voice conduction structure extending toward the front and the rear of the case 1; or as respectively illustrated in FIG. 8 and FIG. 9, the third and the fourth preferred embodiment of the present invention are characterized by that an independent horn 2 is provided in the pre-selected front (FIG. 8) or in the rear (FIG. 9), and the common microphone 3 is provided at the pre-selected position on the case 1 while said common microphone 3 is coupled to the internal voice conduction structure extending toward the front and the rear of the case 1;

(3) An independent horn 2 is each respectively provided in the front and in the rear of the case 1 of the cellular phone, and a common microphone 3 is provided on either side or at other location; as illustrated in FIG. 10, the fifth preferred embodiment of the present invention is characterized by that the independent horn 2 and a common microphone 3 are provided in the front and the rear of the case 1, while said common microphone 3 is couple to an internal voice conduction structure extending toward the front and rear of the case 1;

or as respectively illustrated in FIG. 11 and FIG. 12, the sixth and the seventh preferred embodiments of the present invention are characterized by that the independent horn 2 is each respectively provided in the front and the rear of the case 1, and an independent microphone 3 is provided on either side in the front (FIG. 11) or the rear (FIG. 12) of the case 1;

(4) The eighth preferred embodiment of the present invention as illustrated in FIG. 13 is characterized by that an independent microphone 3 is each provided in the front and the rear of the case 1 of the cellular phone, and said microphone 3 is coupled to an internal voice conduction structure extending toward the front and the rear of the case 1, and a common horn 2 is also coupled to the internal voice structure extending toward the front and the rear of the case 1;

(5) The ninth preferred embodiment of the present invention as illustrated in FIG. 14 characterized by that an independent horn 2 is each provided in the front and the rear of the case 1 of the cellular phone, and is coupled to an internal voice conduction structure extending toward the front and the rear of the case 1, and a common microphone 3 is also coupled to the internal voice structure extending toward the front and the rear of the case 1;

(6) The tenth preferred embodiment of the present invention as illustrated in FIG. 15 is characterized by that an independent horn 2 is each provided in the front and the rear of the case 1 of the cellular phone, and both horns 2 are coupled to an internal voice conduction structure extending toward the front and the rear of the case 1, and a common microphone 3 provided at a pre-selected location; or as illustrated in FIG. 16 and FIG. 17, the eleventh and the twelfth preferred embodiments of the present invention may have a common horn 2 each respectively provided in the front and the rear of the case 1 of the cellular phone, and both common horns are coupled to an internal voice conduction structure extending toward the front and the rear of the case 1, and an independent microphone 3 is respectively provided in the front(FIG. 16) or the rear (FIG. 17) of the case 1.

Figure 18:
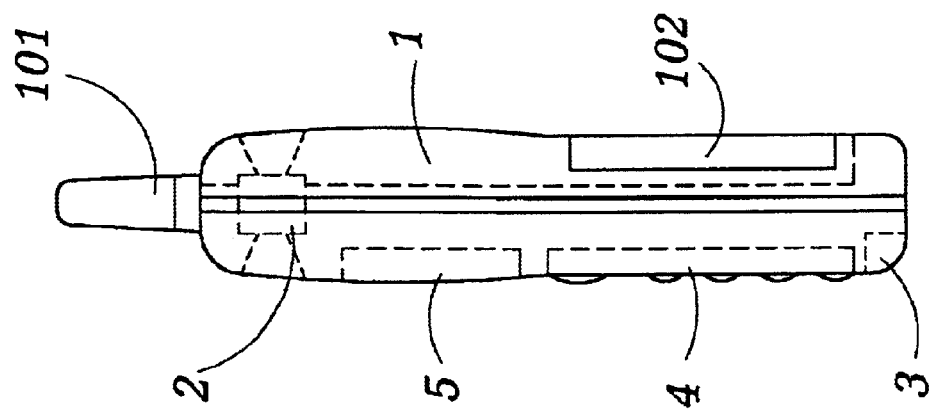
FIG. 18 is a side view of the thirteenth preferred embodiment of the present invention.

Furthermore, according to the structure of a cellular phone voice interface with two-way operation or is arranged facing backward to the keypad provided by the present invention, in the thirteenth preferred embodiment of the present invention as illustrated in FIG. 18, its structure facing backward is comprised of a keypad 4 and a display 5 provided in the front of the case 1 of the cellular phone, while a cell 102, a horn 2 and a microphone are provided in the rear of the case 1 so to separate the electromagnetic wave by means of the case structure and the cell when the cellular phone is in use.

Figure 1:
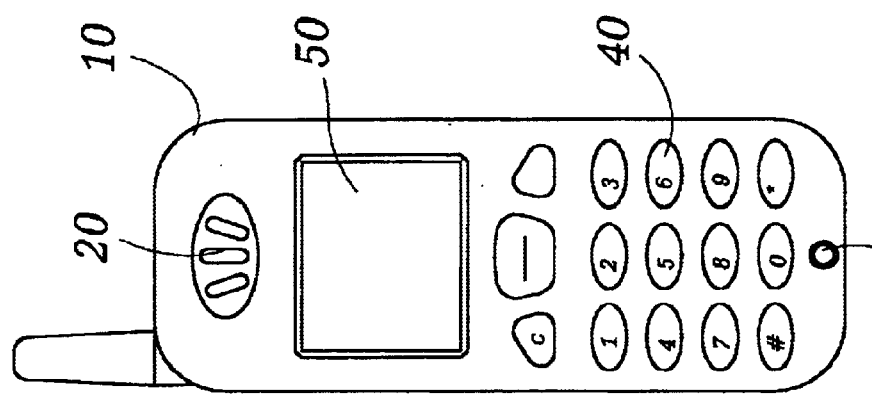
FIG. 1 is a front view of the prior art of a cellular phone.
Figure 19:
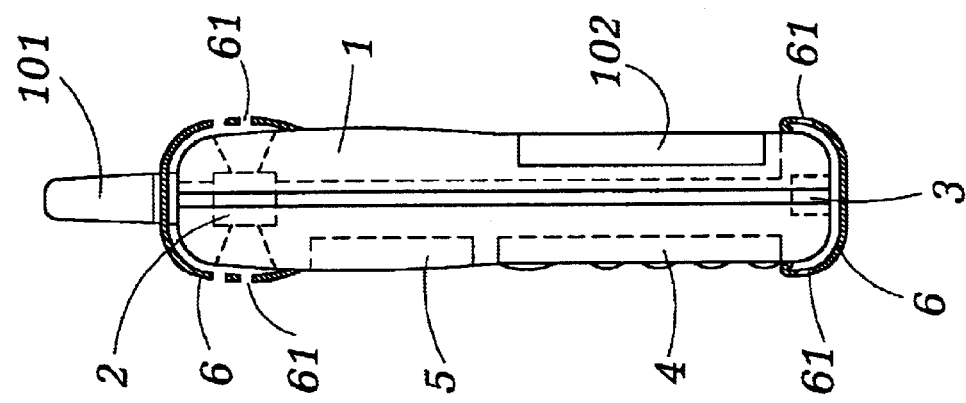
FIG. 19 is a side view of the fourteenth preferred embodiment of the present invention.
Figure 20:
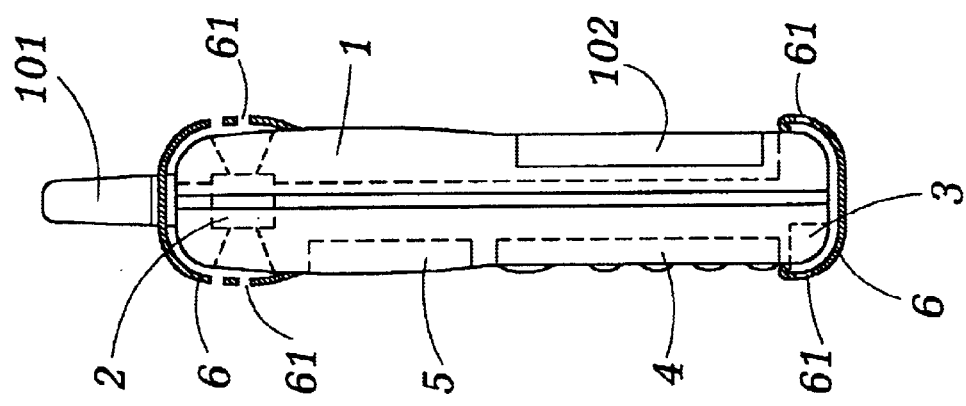
FIG. 20 is a side view of the fifteenth preferred embodiment of the present invention.
Figure 21:
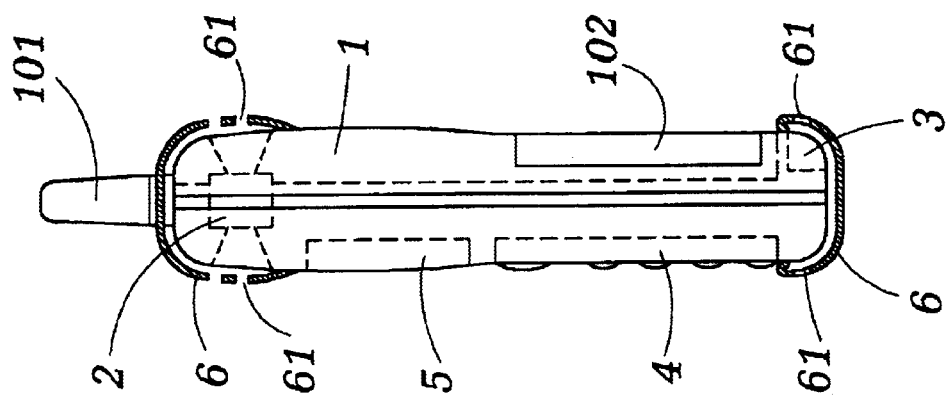
FIG. 21 is a side view of the sixteenth preferred embodiment of the present invention.
Figure 22:
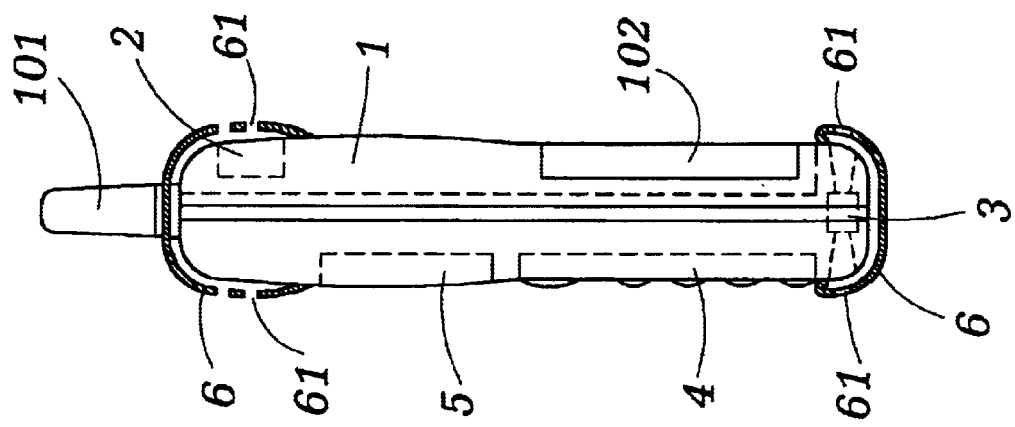
FIG. 22 is a side view of the seventeenth preferred embodiment of the present invention.
Figure 23:
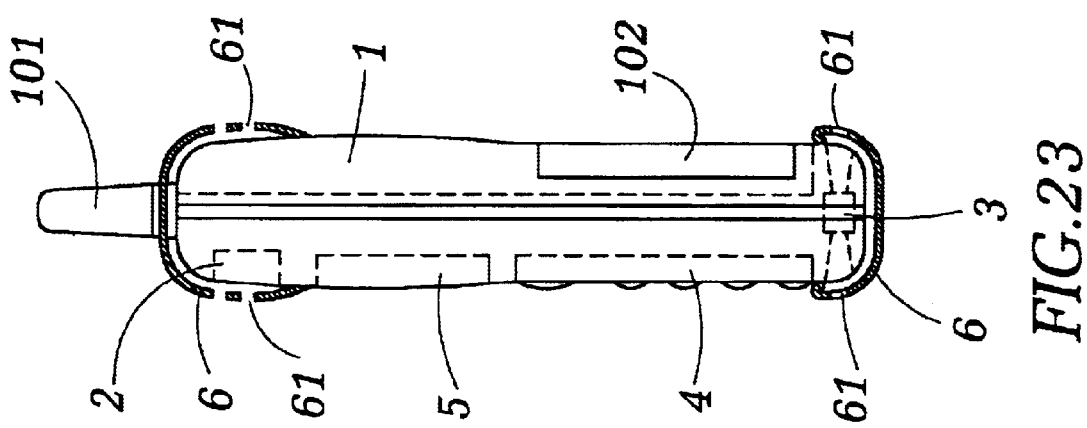
FIG. 23 is a side view of the eighteenth preferred embodiment of the present invention.
Figure 24:
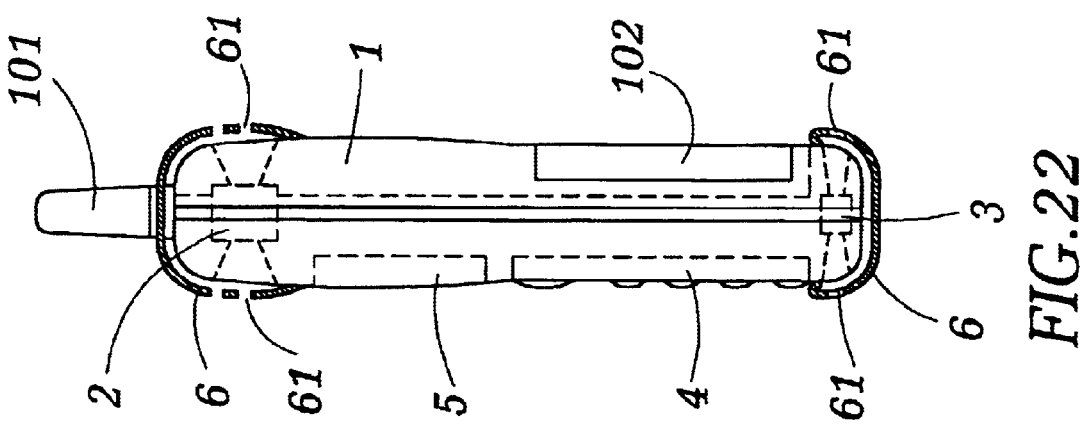
FIG. 24 is a side view of the nineteenth preferred embodiment of the present invention.
Figure 29:
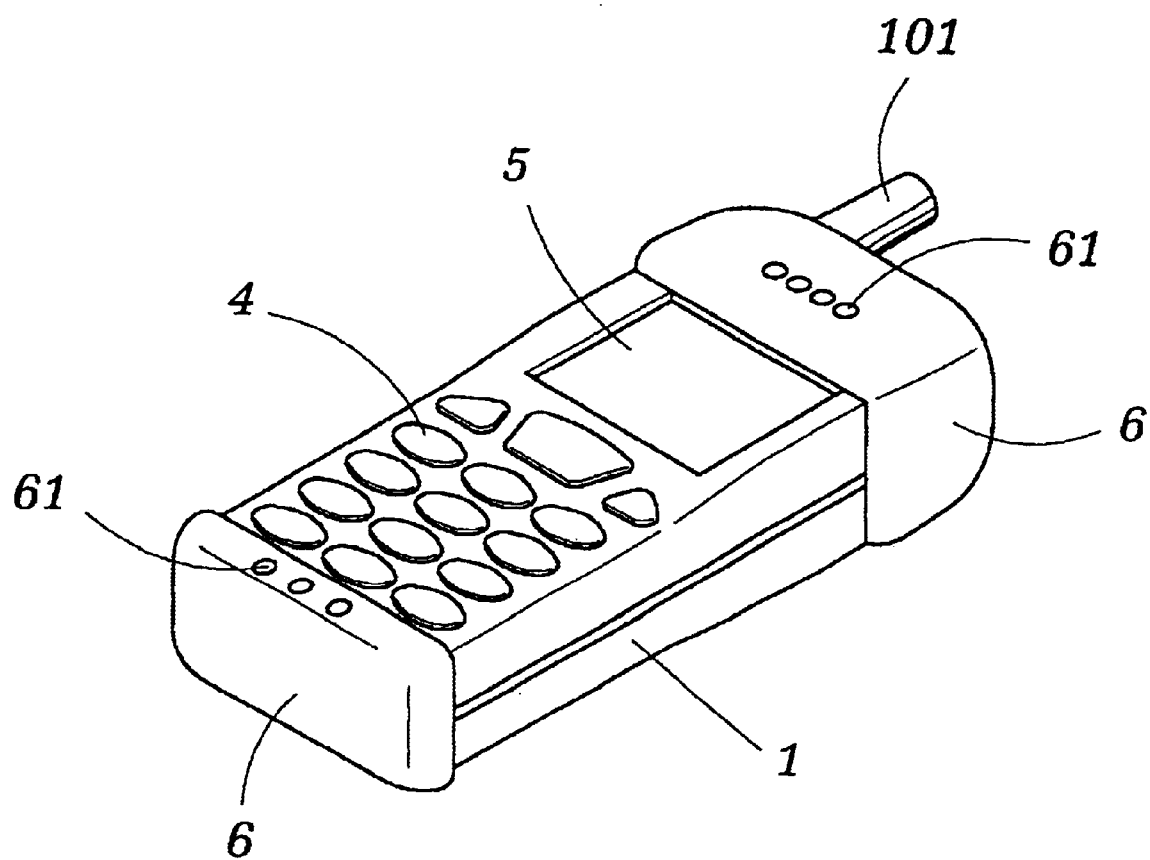
FIG. 29 is a view showing that the present invention is provided with a voice conduction hood having a hollow middle section and completely covers up both upper and lower ends of the case.
Figures 2, 29:
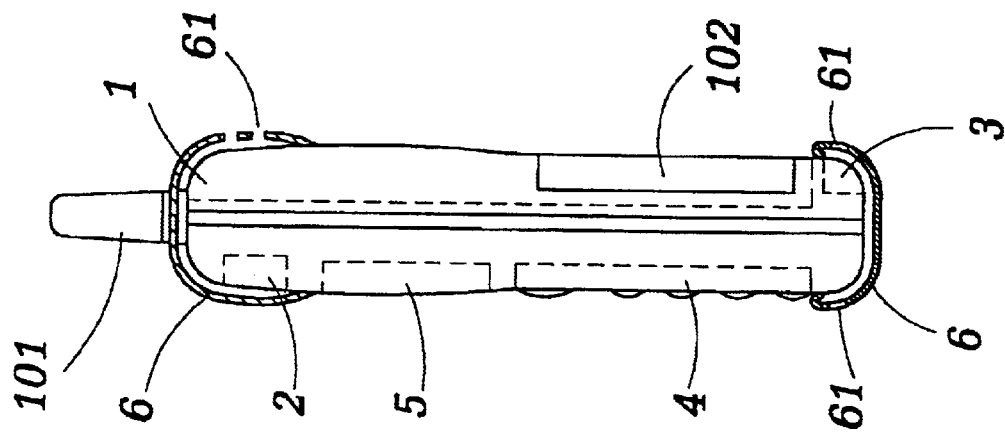
Figures 1, 29:
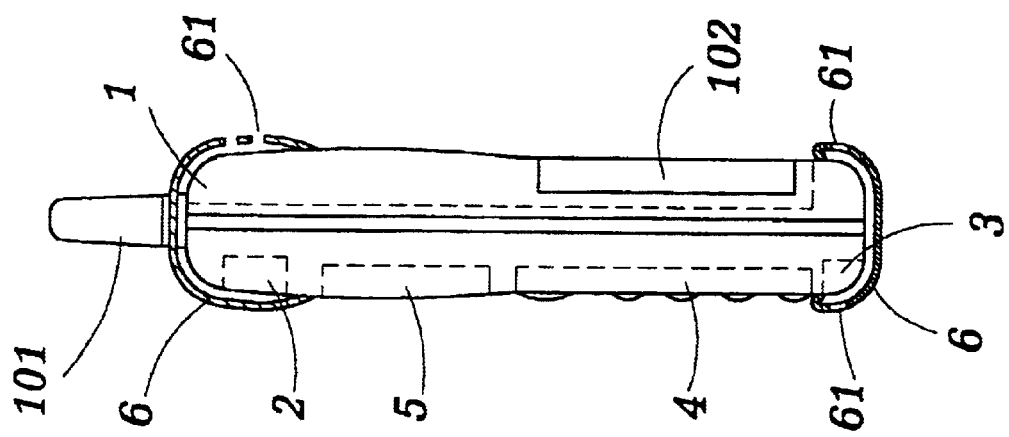
Figures 4, 29:
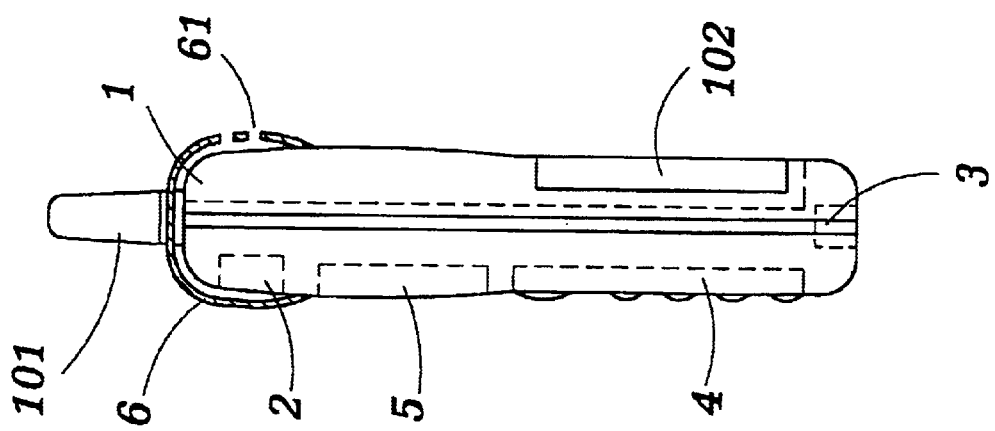
Figures 3, 29:
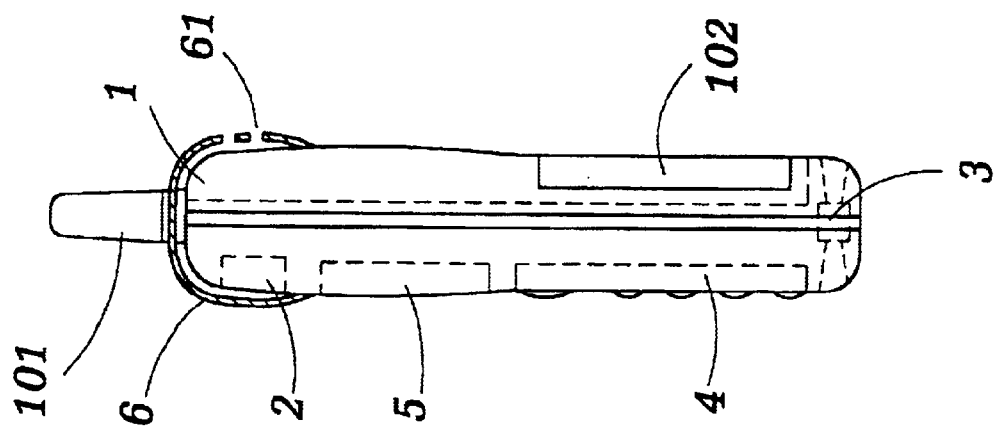
Figures 5, 6, 29:
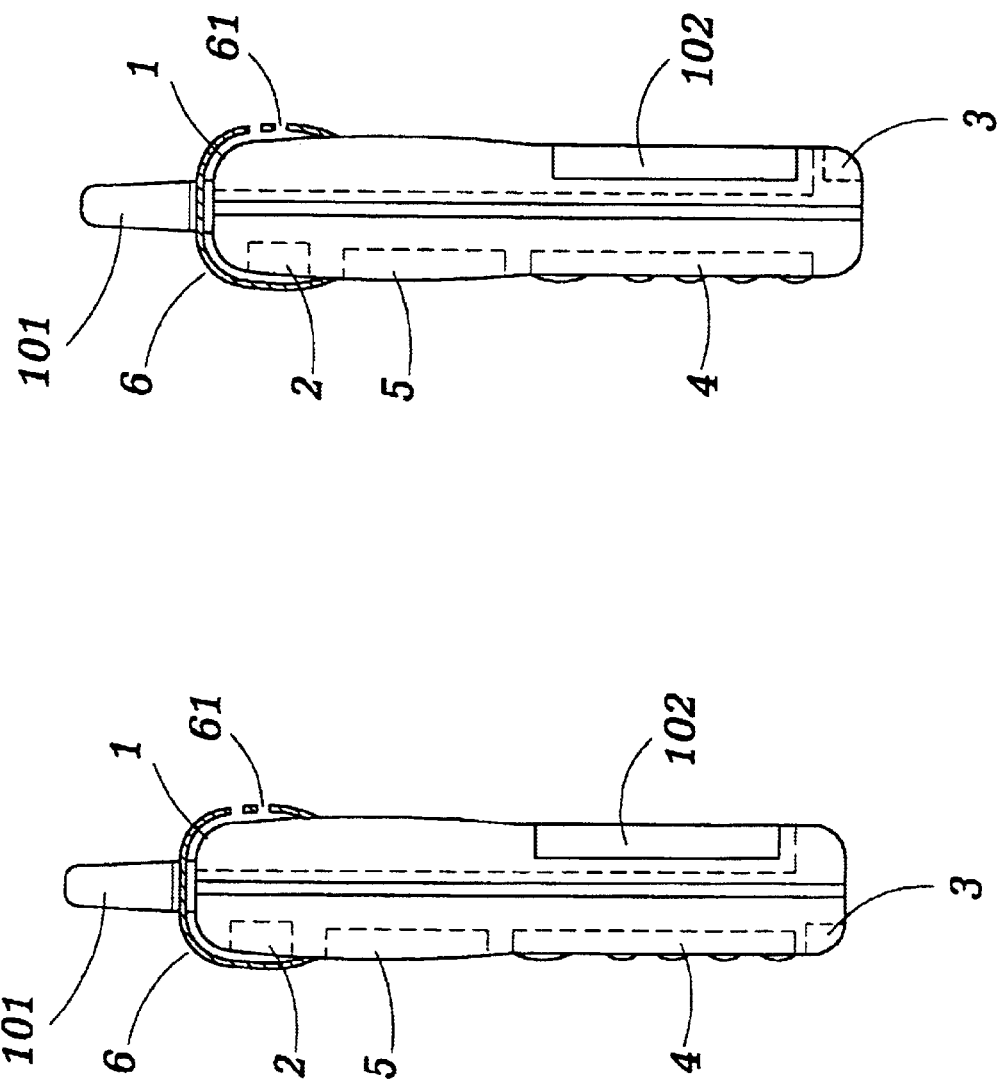
Figure 30:
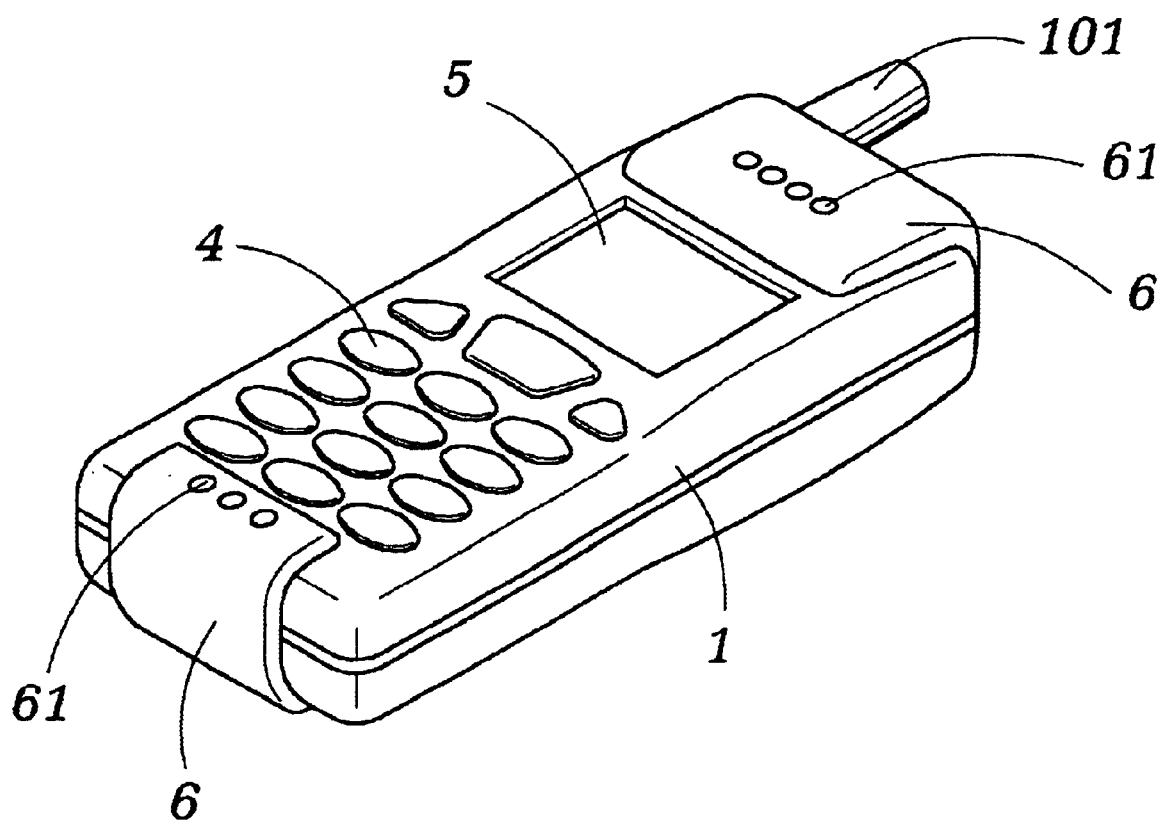
FIG. 30 is a view showing that the present inventions is provided with a voice conduction hood having a hollow middle section and partially covers up both upper and lower ends of the case.

The structure of a cellular phone voice interface with two-way operation or is arranged facing backward to the keypad may be comprised of an additional external voice conduction hood, with each application including:

(1) In the fourteenth preferred embodiment of the present invention as illustrated in FIG. 19, a hemispheric or C-shape or ring-shape voice conduction hood 6 is provided on the same side of the case 1 of the cellular phone where a common horn 2 is located, while a hemispheric or C-shape or ring-shape voice conduction hood 6 is also provided on the transmission side of a common microphone 3;

or in the fifteenth and the sixteenth preferred embodiments of the present invention as illustrated in FIG. 20 and FIG. 21, a hemispheric or C-shape or ring-shape voice conduction hood 6 is provided on the same side of the case 1 of the cellular phone where the common horn 2 is located; and an independent microphone 3 is provided at a pre-selected location either in the front (20) or the rear (20) of the case 1; and a hemispheric or C-shape or ring-shape voice conduction hood 6 is provided on the transmission side of the case 1;

The seventeenth preferred embodiment of the present invention as illustrated in FIG. 22 is characterized by that a common horn 2 is respectively provided on both in the front and the rear of the case 1 of the cellular phone with both horns coupled to an internal voice conduction structure extending toward the front and the rear of the case 1; a common microphone 3 is each provided and also coupled to the internal voice conduction structure extending toward the front and the rear of the case 1; and a hemispheric or C-shape or ring-shape voice conduction hood 6 is each provided on the transmission and the receiving sides of the cellular phone; or The eighteenth and the ninth preferred embodiment of the present invention as illustrated in FIG. 23 and FIG. 24, characterized by that an independent horn 2 is provided either in the front (FIG. 23) or the rear (FIG. 24), and a common microphone 3 is provided and coupled to an internal voice conduction structure extending toward the front and the rear of the case while a hemispheric or C-shape or ring-shape voice conduction hood 6 is provided respectively on the transmission and the receiving sides of the cellular phone; or As illustrated in FIGS. 25 and 26, the twentieth and the twenty-first preferred embodiments of the present invention are characterized by that an independent horn 2 and a microphone 3 are at the same time provided in the front (FIG. 25) or in the rear (FIG. 26); meanwhile, a hemispheric or C-shape or ring-shape voice conduction hood 6 is each provided on the transmission and the receiving side; or As illustrated in FIGS. 27 and 28, the twenty-second and the twenty-third preferred embodiments of the present invention are characterized by that an independent horn 2 is provided in the front and a microphone is provided in the rear of the case 1 of the cellular phone FIG. 27), or a microphone 3 is provided in the front and an independent horn 2 is provided in the rear of the case 1 of the cellular phone (FIG. 28); meanwhile, a hemispheric or C-shape or ring-shape voice conduction hood 6 is each provided on the transmission and the receiving side;

One or more than one voice conduction pores 61 are provided on the voice conduction hood 6 respectively close to the horn 2 in the upper end and to the microphone 3 in the lower as illustrated in FIG. 29. Said voice conduction pore 61 may be either respectively provided on the font and the rear sides of the case 1 at the same time, or only having the pore 61 corresponding to the horn 2 is provided the rear of the case 1 (as illustrated by those preferred embodiments in FIGS. 29-1 through 29-6), so to reduce the electromagnetic wave the head of the user is exposed to by having the case 1 as the screen; Furthermore, the configuration of said hood 6 is not limited to either separately covering up or simply gripping on both ends of the case 1. As illustrated in FIG. 30, the hood 6 may be made as a C-shape holding cover so to clamp onto either the upper end of the case 1 where the horn 2 is provided or onto the lower end of the case 1 where the microphone 3 is provided for positive or backward operation of the cellular phone as selected by the user to reduce the electromagnetic wave the head of the user is exposed to without compromising the convenience of key entering and transmission/receiving operation.

Figure 35:
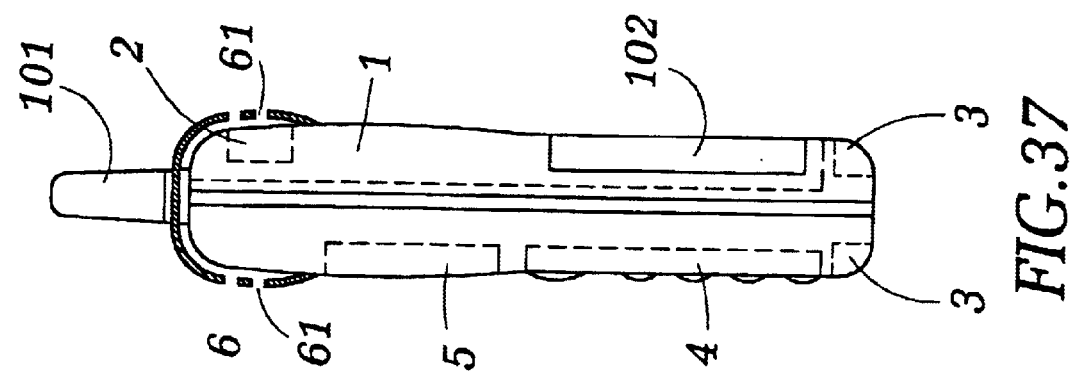
FIG. 35 is a side view of the twenty-eighth preferred embodiment of the present invention.
Figure 36:
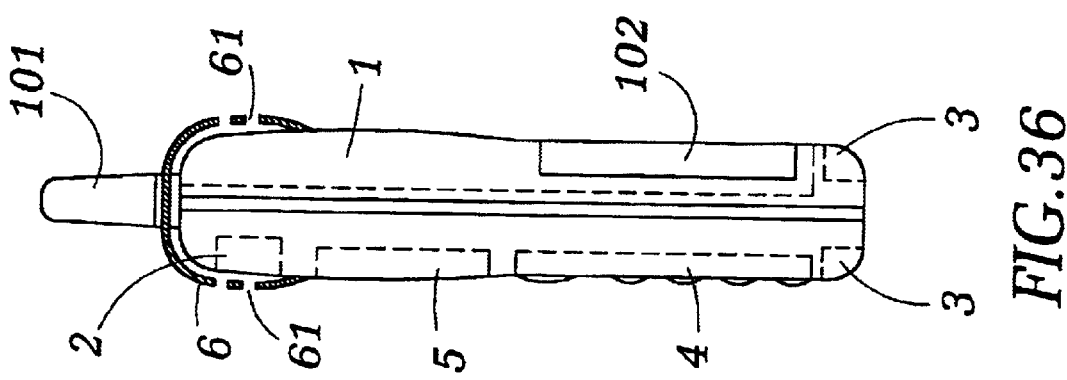
FIG. 36 is a side view of the twenty-ninth preferred embodiment of the present invention.
Figure 37:
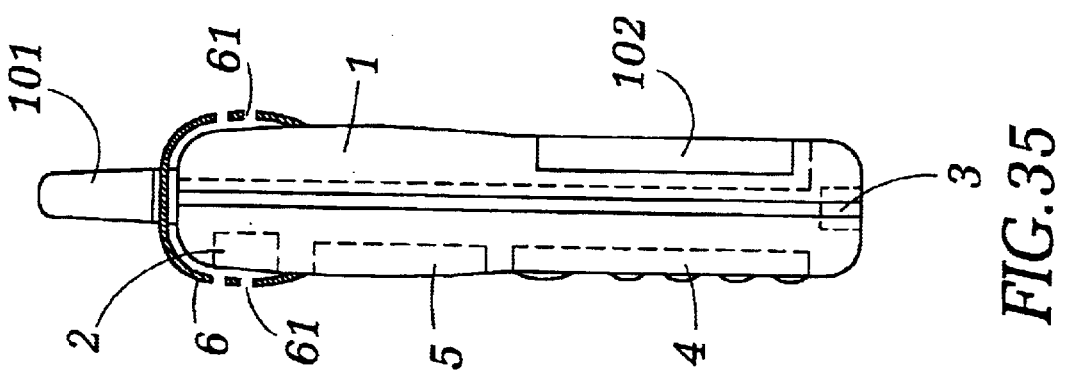
FIG. 37 is a side view of the thirtieth preferred embodiment of the present invention.
Figure 38:
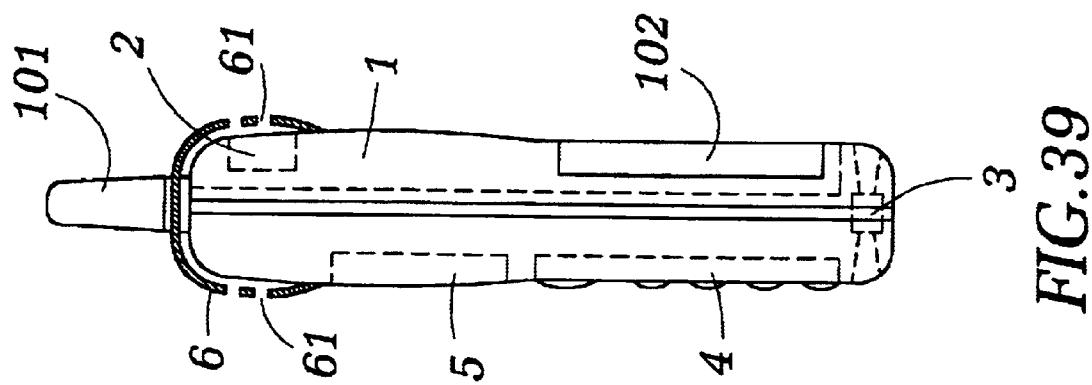
FIG. 38 is a side view of the thirty-first preferred embodiment of the present invention.
Figure 39:
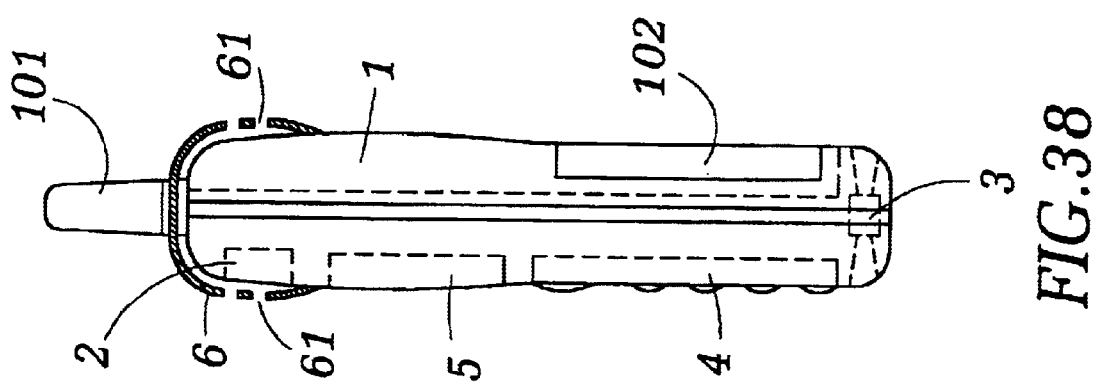
FIG. 39 is a side view of the thirty-second preferred embodiment of the present invention.
Figure 40:
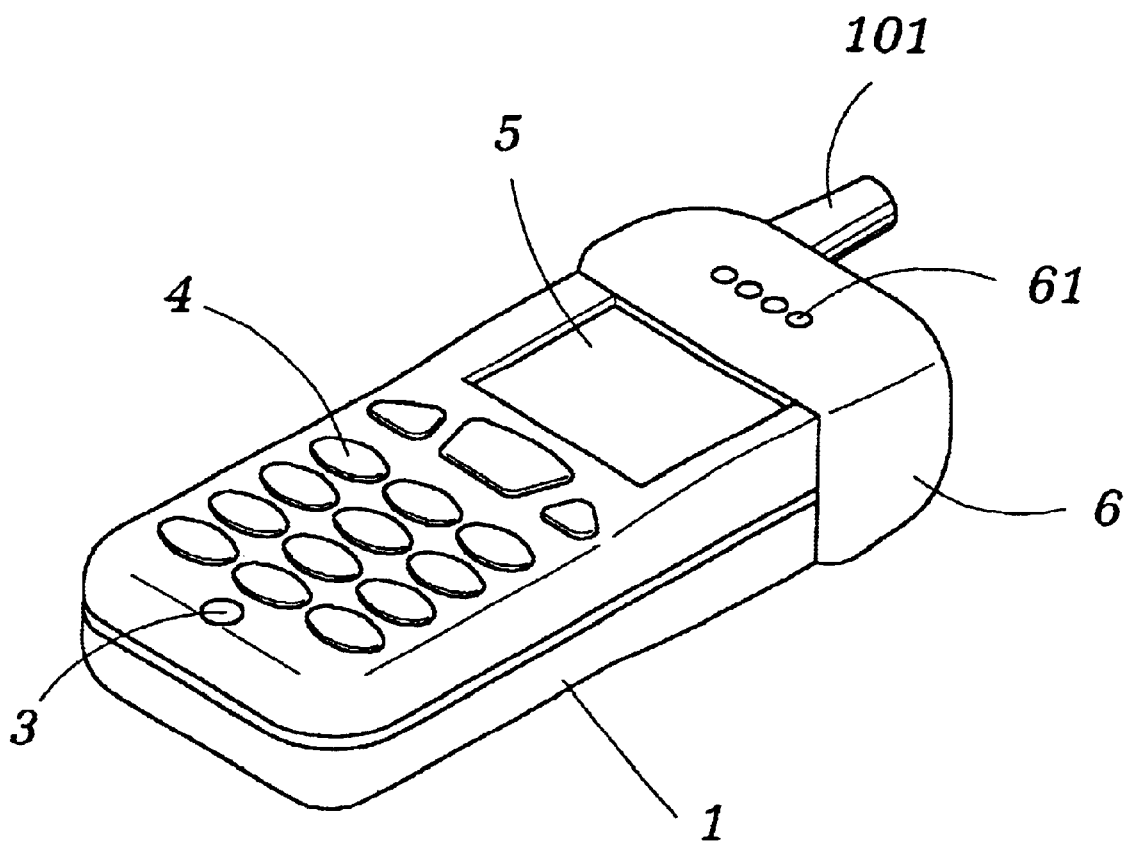
FIG. 40 is a side view of the present invention having at the top of the case provided with a voice conduction hood.

(2) A hemispheric or C-shape or ring-shape voice conduction hood 6 is provided on the side at the upper end of the case 1 of the cellular phone where a horn 2 is provided while on the side at where a microphone 3 is provided maintains its normal structure (i.e. no voice conduction hood 6 is provided)as illustrated in FIG. 31, wherein, the twenty-fourth preferred embodiment of the present invention is characterized by that an independent horn 2 and an independent microphone 3 are both provided in the front of the case 1 of the cellular phone and a hemispheric or C-shape or ring-shape voice conduction hood 6 is provided only on the receiving side; or As illustrated in FIG. 32, the twenty-fifth preferred embodiment of the present invention is characterized by that an independent horn 2 and an independent microphone 3 are both provided in the rear of the case 1 of the cellular phone and a hemispheric or C-shape or ring-shape voice conduction hood 6 is provided only on the receiving side; or As respectively illustrated in FIGS. 33 and 34, the twenty-sixth and the twenty-seventh preferred embodiments of the present invention are characterized by that an independent horn 2 is provided in the front and an independent microphone 3 is provided in the rear of the case 1 of the cellular phone (FIG. 33) or the independent horn 2 is provided in the rear and the independent microphone 3 is provided in the front of the case 1 of the cellular phone (FIG. 34), while a hemispheric or C-shape or ring-shape voice conduction hood 6 is provided only on the receiving side; or As illustrated in FIG. 35, the twenty-eighth preferred embodiment of the present invention is characterized by that an independent horn 2 is provided in the front of the case 1 of the cellular phone and a common microphone 3 is provided at a pre-selected location while a hemispheric or C-shape or ring-shape voice conduction hood 6 is provided only on the receiving side; or As illustrated in FIGS. 36 and 37, the twenty-ninth and the thirtieth preferred embodiments of the present invention are characterized by that an independent horn 2 is provided either in the front (FIG. 36) or in the rear (FIG. 37) of the case 1 of the cellular phone, and a microphone 3 is each respectively provided on both sides of the case 1 of the cellular phone, meanwhile a hemispheric or C-shape or ring-shape voice conduction hood 6 is provided only on the receiving side; or As illustrated in FIGS. 38 and 39, the thirty-first and the thirty-second preferred embodiments of the present invention are characterized by that an independent horn 2 is provided in the front (FIG. 38) or in the rear (FIG. 39) of the case 1 of the cellular phone, and a common microphone 3 is provided and coupled to an internal voice conduction structure extending toward the front and the rear of the case 1 of the cellular phone, meanwhile a hemispheric or C-shape or ring-shape voice conduction hood 6 is provided only on the receiving side. FIG. 40 is a schematic view representing those preferred embodiments disclosed in this subparagraph (2).

Figure 45:
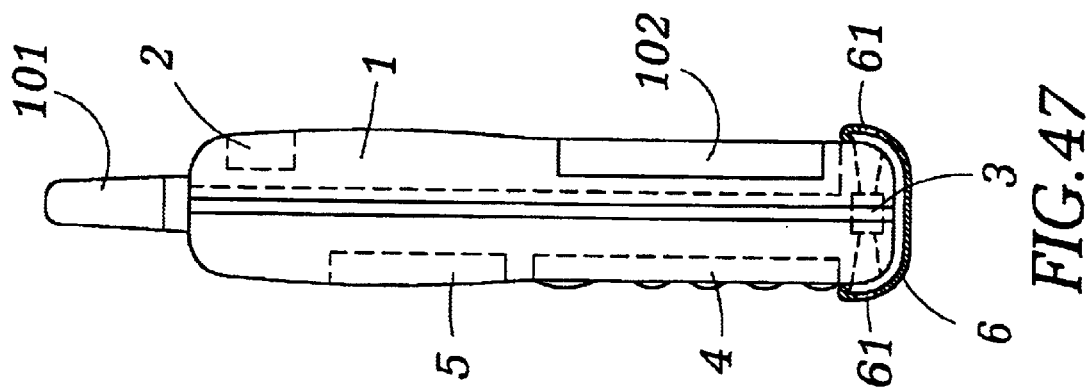
FIG. 45 is a side view of the thirty-seventh preferred embodiment of the present invention.
Figure 46:
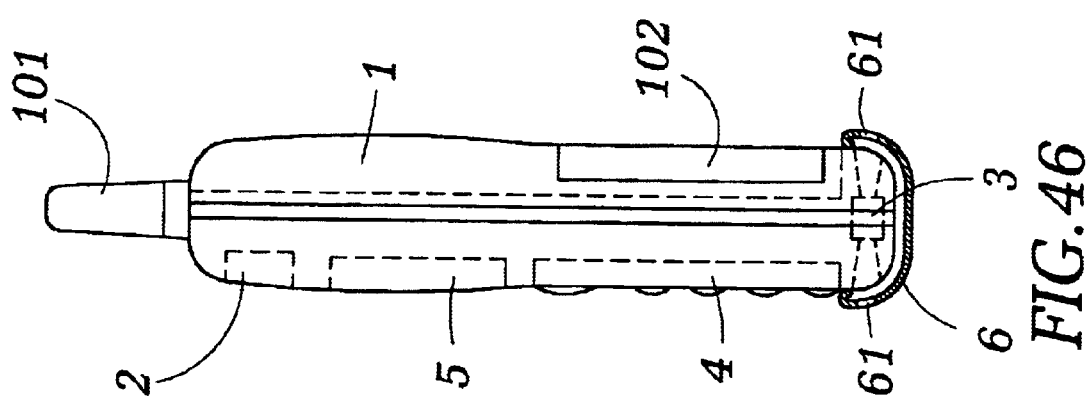
FIG. 46 is a side view of the thirty-eighth preferred embodiment of the present invention.
Figure 47:
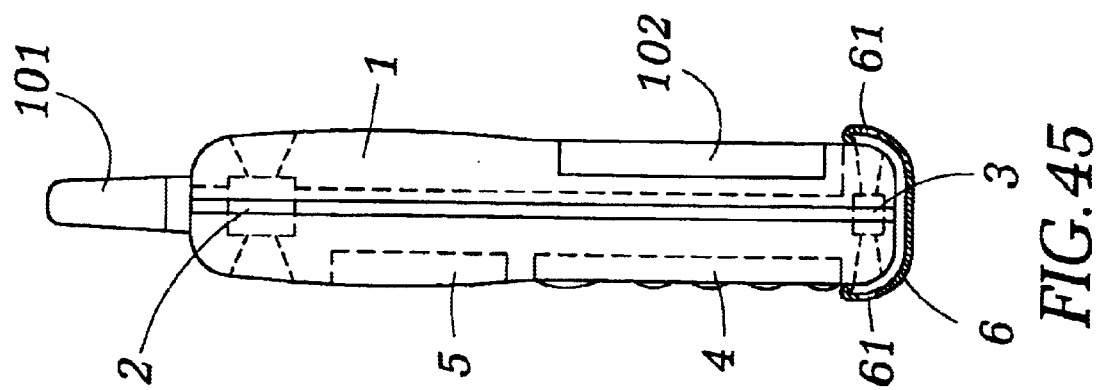
FIG. 47 is a side view of the thirty-ninth preferred embodiment of the present invention.
Figure 48:
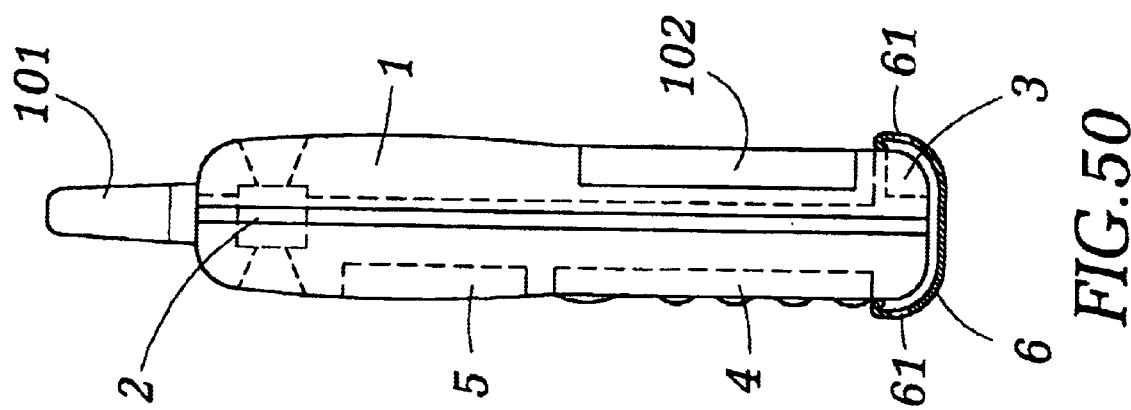
FIG. 48 is a side view of the fortieth preferred embodiment of the present invention.
Figure 49:
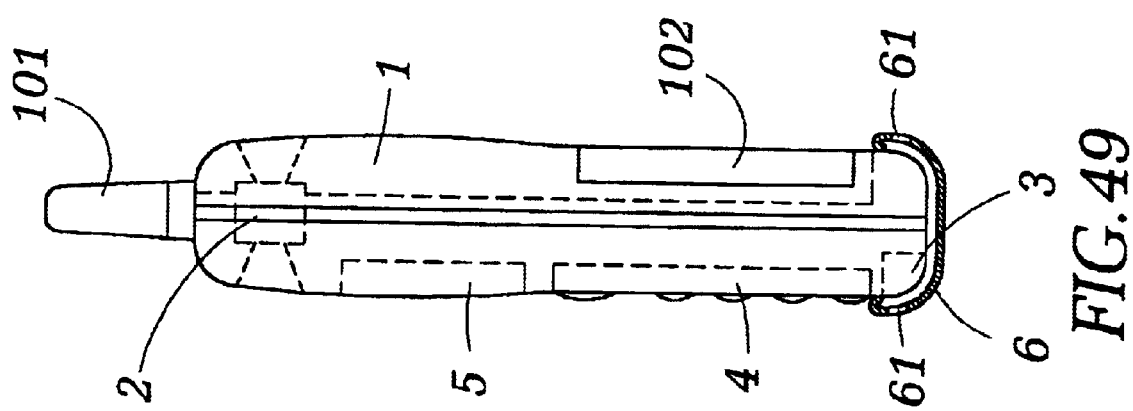
FIG. 49 is a side view of the forty-first preferred embodiment of the present invention.
Figure 50:
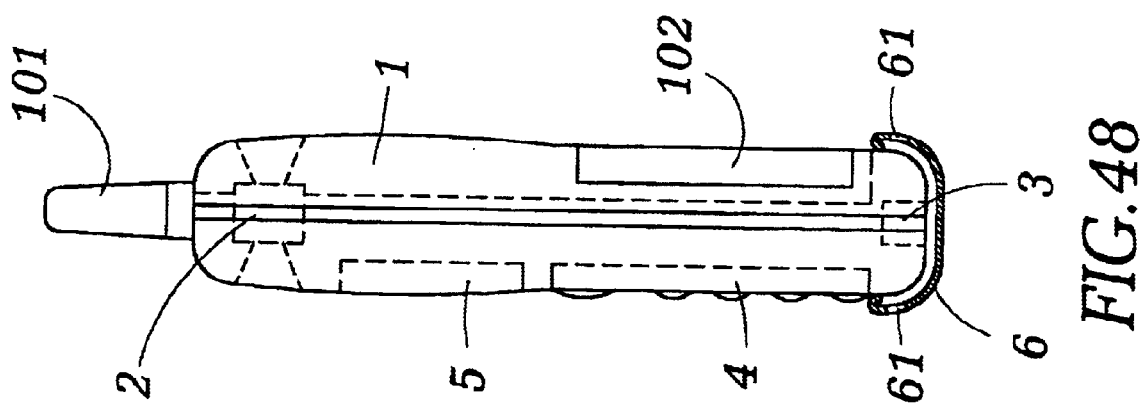
FIG. 50 is a side view of the forty-second preferred embodiment of the present invention.
Figure 51:
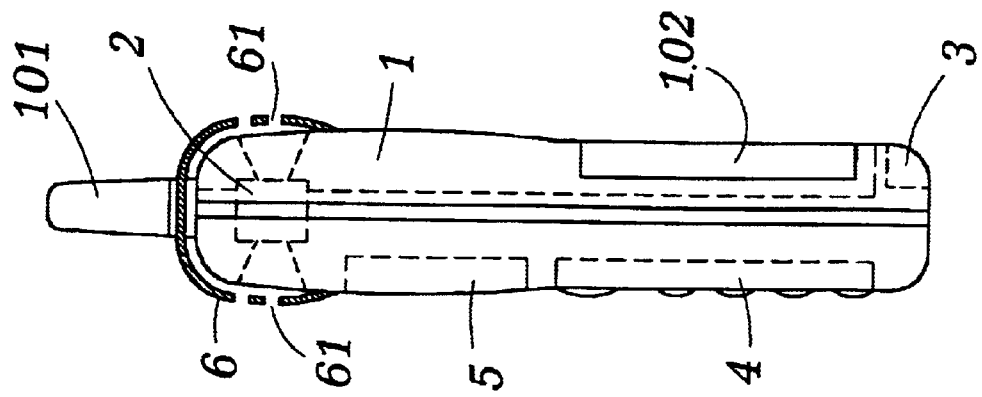
FIG. 51 is a side view of the forty-third preferred embodiment of the present invention.
Figure 52:
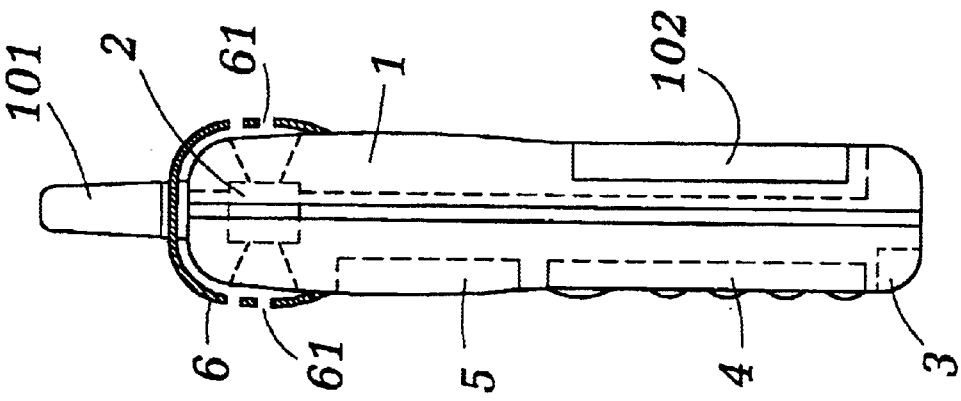
FIG. 52 is a side view of the forty-fourth preferred embodiment of the present invention.
Figure 53:
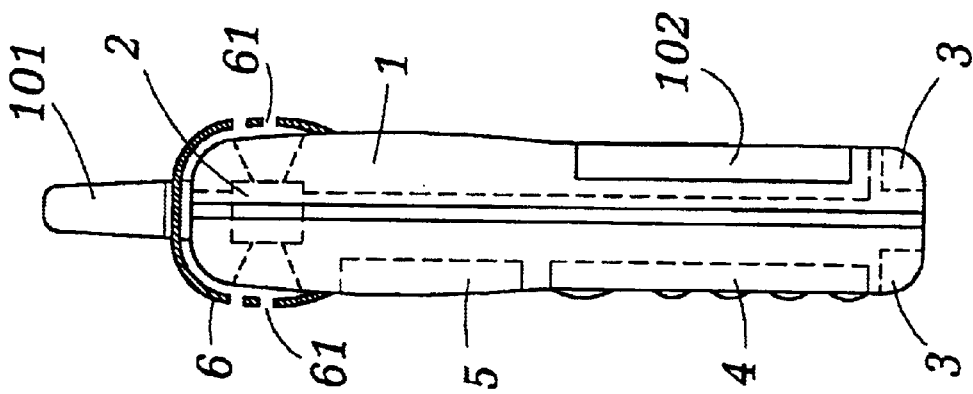
FIG. 53 is a side view of the forty-fifth preferred embodiment of the present invention.
Figure 54:
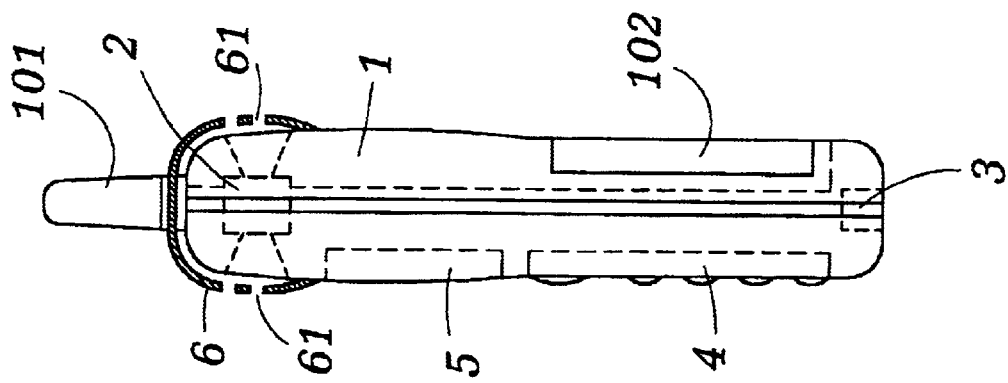
FIG. 54 is a side view of the forty-sixth preferred embodiment of the present invention.
Figure 55:
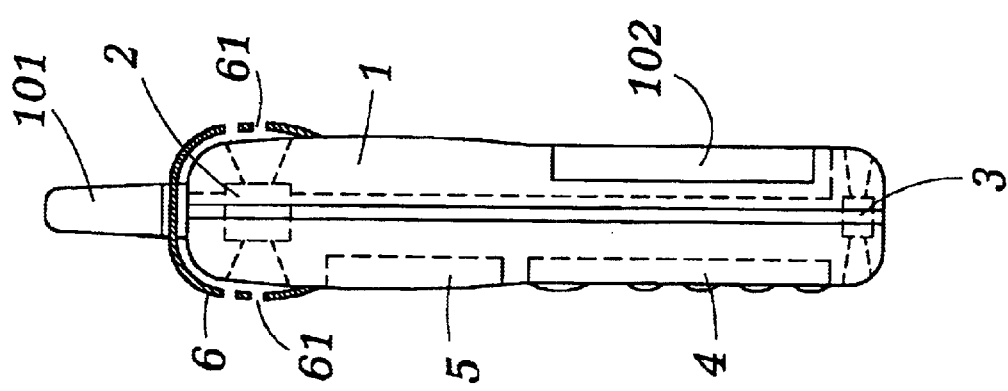
FIG. 55 is a side view of the forty-seventh preferred embodiment of the present invention.
Figure 63:
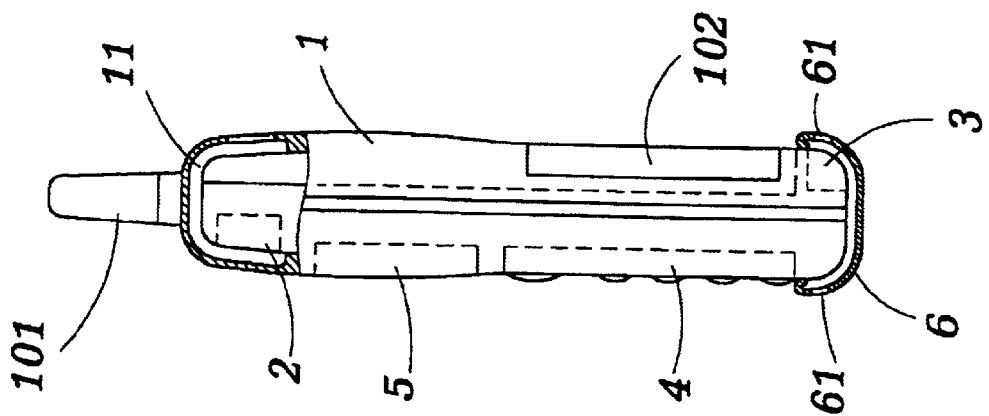
FIG. 63 is a view of the second preferred embodiment of the present invention, in which an integrated sound wave path is provided exclusively for the independent case.
Figure 62:
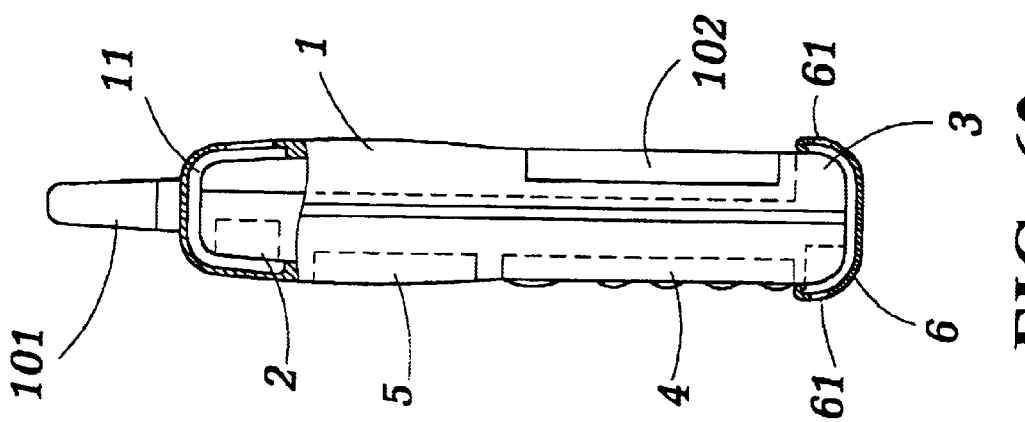
FIG. 62 is a view of the first preferred embodiment of the present invention, in which an integrated sound wave path is provided exclusively for the independent case.
Figure 64:
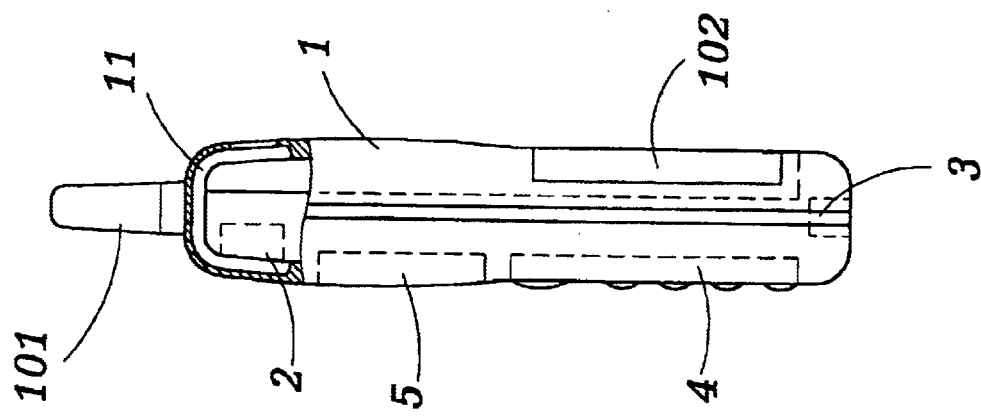
FIG. 64 is a view of the third preferred embodiment of the present invention, in which an integrated sound wave path is provided exclusively for the independent case.
Figure 65:
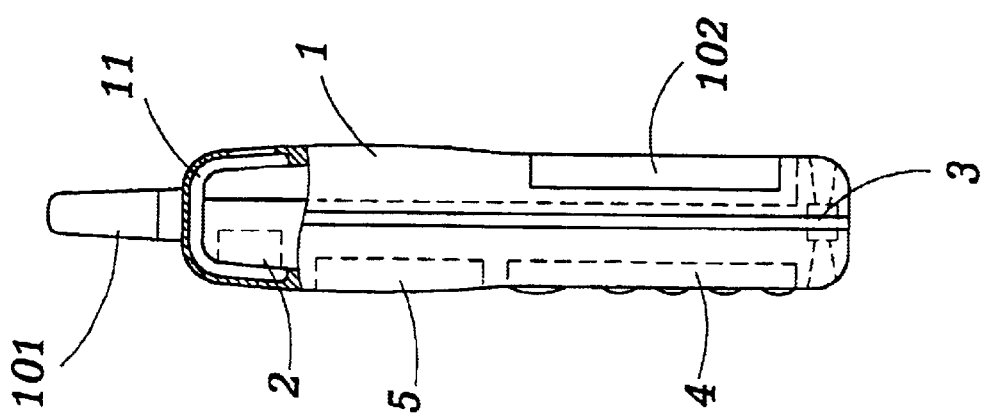
FIG. 65 is a view of the fourth preferred embodiment of the present invention, in which an integrated sound wave path is provided exclusively for the independent case.
Figure 67:
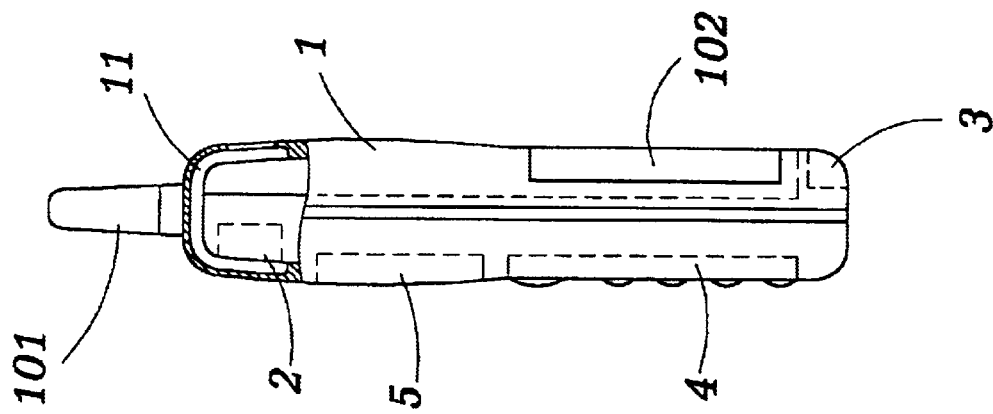
FIG. 67 is a view of the sixth preferred embodiment of the present invention, in which an integrated sound wave path is provided exclusively for the independent case.
Figure 66:
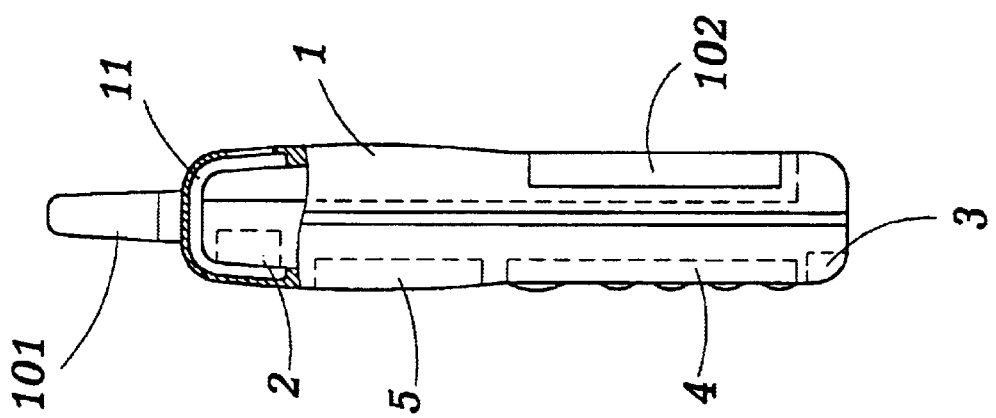
FIG. 66 is a view of the fifth preferred embodiment of the present invention, in which an integrated sound wave path is provided exclusively for the independent case.

(3) A hemispheric or C-shape or ring-shape voice conduction hood 6 is provided on the side at the lower end of the case 1 of the cellular phone where a microphone 3 is provided while on the side at where a horn 2 is provided maintains its normal structure (i.e. no voice conduction hood 6 is provided)as illustrated in FIG. 41, wherein, the thirty-third preferred embodiment of the present invention is characterized by that an independent horn 2 and an independent microphone 3 are both provided in the front of the case 1 of the cellular phone and a hemispheric or C-shape or ring-shape voice conduction hood 6 is provided only on the transmission side; or As illustrated in FIG. 42, the thirty-fourth preferred embodiment of the present invention is characterized by that an independent horn 2 and an independent microphone 3 are both provided in the rear of the case 1 of the cellular phone and a hemispheric or C-shape or ring-shape voice conduction hood is provided only on the transmission side; or As respectively illustrated in FIGS. 43 and 44, the thirty-fifth and the thirty-sixth preferred embodiments of the present invention are characterized by that an independent horn 2 is provided in the front and an independent microphone 3 is provided in the rear of the case 1 of the cellular phone (FIG. 43) or the independent horn 2 is provided in the rear and the independent microphone 3 is provided in the front of the case 1 of the cellular phone (FIG. 44), while a hemispheric or C-shape or ring-shape voice conduction hood 6 is provided only on the transmission side; or As illustrated in FIG. 45, the thirty-seventh preferred embodiment of the present invention is characterized by that a common horn 2 is each provided in the front and the rear of the case 1 of the cellular phone and is coupled to an internal voice conduction structure extending toward the front and the rear of the case 1 of the cellular phone; also a common microphone 3 is each provided in the front and the rear of the case 1 of the cellular phone and is coupled to an internal voice conduction structure extending toward the front and the rear of the case 1 of the cellular phone, meanwhile a hemispheric or C-shape or ring-shape voice conduction hood 6 is provided only on the transmission side; or As respectively illustrated in FIGS. 46 and 47, the thirty-eighth and the thirty-ninth preferred embodiments of the present invention are characterized by that an independent horn 2 is provided either in the front (FIG. 46) or in the rear (FIG. 47) of the case 1 of the cellular phone, and a common microphone 3 is each respectively provided on both sides of the case 1 of the cellular phone and is coupled to an internal voice conduction structure, meanwhile, a hemispheric or C-shape or ring-shape voice conduction hood 6 is provided only on the transmission side; or As illustrated in FIG. 48, the fortieth preferred embodiment of the present invention is characterized by that a common horn 2 is each provided in the front and the rear at the upper end of the case 1 of the cellular phone and is coupled to an internal voice conduction structure extending toward the front and the rear of the case 1 of the cellular phone; and a common microphone 3 is provided at the lower end of the case 1 of the cellular phone, meanwhile, a hemispheric or C-shape or ring-shape voice conduction hood 6 is provided only on the transmission side; or As illustrated in FIGS. 49 and 50, the forty-first and the forty-second preferred embodiments of the present invention are characterized by that a common horn 2 is each provided in the front and the rear at the upper end of the case 1 of the cellular phone and is coupled to an internal voice conduction structure extending toward the front and the rear of the case 1 of the cellular phone; and an independent microphone 3 is provided either in the front (FIG. 49) or in the rear (FIG. 50) at the lower end of the case 1 of the cellular phone, meanwhile, a hemispheric or C-shape or ring-shape voice conduction hood 6 is provided only on the transmission side;

(4) A hemispheric or C-shape or ring-shape voice conduction hood 6 is provided on the side at the upper end of the case 1 of the cellular phone where a common horn 2 is provided while on the side at where a microphone 3 is provided maintains its normal structure as illustrated in FIG. 51, wherein, the forty-third preferred embodiment of the present invention is characterized by that a common horn 2 is provided and is coupled to an internal voice conduction structure extending toward the front and the rear of the case 1 of the cellular phone, an independent microphone is each provided in the front and the rear at the lower end of the case 1 of the cellular phone, meanwhile a hemispheric or C-shape or ring-shape voice conduction hood 6 is provided only on the receiving side; or As respectively illustrated in FIGS. 52 and 53, the forty-fourth and the forty-fifth preferred embodiments of the present invention are characterized by that a common horn 2 is provided at the upper end of the case 1 of the cellular phone and is coupled to an internal voice conduction structure extending toward the front and the rear of the case 1 of the cellular phone, an independent microphone 3 is provided either in the front (FIG. 52) or in the rear (FIG. 53) at the lower end of the case 1 of the cellular phone, and a hemispheric or C-shape or ring-shape voice conduction hood 6 is provided on the receiving side; or As illustrated in FIG. 54, the forty-sixth preferred embodiment of the present invention is characterized by that a common horn 2 is each provided in the front and the rear of the case 1 of the cellular phone and both of said common horns are coupled to an internal voice conduction structure extending toward the front and the rear of the case 1 of the cellular phone; a common microphone 3 is provided and coupled to an internal voice. conduction structure extending toward the front and the rear of the case 1 of the cellular phone, and a hemispheric or C-shape or ring-shape voice conduction hood 6 is provided on the receiving side; or As illustrated in FIG. 55, the forty-seventh preferred embodiment of the present invention is characterized by that a common horn 2 is each provided in the front and in the rear of the case 1 of the cellular phone and both said common horns are coupled to an internal voice conduction structure extending toward the front and the rear of the case 1 of the cellular phone, a common microphone 3 is provided at a pre-selected location, and a hemispheric or C-shape or ring-shape voice conduction hood 6 is provided on the receiving side;

Similarly, the present invention can be further applied to a cellular phone with flip-cover as illustrated in FIGS. 56 and 57, wherein, the forty-eighth and the forty-ninth preferred embodiments of the present invention are characterized by that a horn 2 is each provided in the front and the rear (FIG. 56), or in the rear (FIG. 57) of the case 1 of the flip-cover cellular phone, or a common horn 2 is provided on the case 1 of said flip-cover cellular phone and is coupled to an internal voice conduction structure extending toward the front and the rear of the case 1 of the flip-cover cellular phone of the fiftieth preferred embodiment of the present invention as illustrated in FIG. 58, and a microphone 3 is normally provided at the flip-cover; or As illustrated in FIG. 59, the fifty-first preferred embodiment of the present invention, wherein, a common horn 2 is provided on the case 1 of the flip-cover and is coupled to an internal voice conduction structure extending toward the front and the rear of the case 1, a microphone 3 is normally provided on the flip-cover, and a hemispheric or C-shape or ring-shape voice conduction hood 6 is provided on the receiving side;

Similarly, as respectively illustrated in FIG. 60 and FIG. 61, in the fifty-second and the fifty-third preferred embodiment of the present invention, an independent horn 2 is provided in the front (FIG. 60) or in the rear (FIG. 61) of a flip-cover cellular phone, a hemispheric or C-shape or ring-shape voice conduction hood 6 is provided on the receiving side, and a microphone 3 is normally provided on the flip-cover.

Each of those preferred embodiments of the case 1 described above may be further integrally formed with one or more than one voice wave path 11 at the selected voice message receiving/transmitting location to replace the voice conduction pore 61 and to omit the provision of the member of said voice conduction hood 6; so that said path 11 of the case 1 may be respectively provided at the front and rear sides of the case 1; or having the path 11 corresponding to the horn 2 is provided only in the rear of the case 1 (as illustrated in those preferred embodiments in FIGS. 62–67), whereby a cellular phone is provided allowing the user to choose to operate and control it in either direction as desired, and it also allows to reduce the electromagnetic wave the user is exposed to while using the cellular phone by having the case 1 as a screen without compromising the convenience of key entering and executing hand-held transmission and receiving.

By means of those preferred embodiments disclosed in the first up to the fifty-third preferred embodiments of the present invention, the case 1 of a cellular phone(including one with flip-cover) allows positive or backward operation and is capable of reducing the electromagnetic wave the user is exposed to while using the cellular phone by having the case 1 as a screen without compromising the convenience of key entering and executing hand-held transmission and receiving.

To sum up, the present invention of a cellular phone allowing its voice interface and control keypad be arranged either in 2-way or in opposite is capable of reducing the electromagnetic wave the head of the user is exposed to without compromising the convenience of key entering and executing hand-held transmission and receiving.

What is claimed is:

1. A voice interface structure of a cellular phone allowing 2-way operation, essentially comprised of a case of the cellular phone, a horn, a microphone, a keypad, a display, an external or built-in antenna and a cell, characterized in that a voice interface is situated on an opposite side of the case from the keyboard control, wherein the case provides a screen to reduce electromagnetic waves to which the head of the user is exposed without compromising the convenience of key entering and executing transmission and receiving, wherein:

independent horns and independent microphones are each respectively provided in the front and the rear of the case of the cellular phone; or the independent horns are provided in the front and the real of the case of the cellular phone, and a common microphone is coupled to an internal voice conduction structure extending toward the front and rear of the case; or the independent horns are provided either in the front or the rear of the case; and the independent microphone is respectfully provided at another location with a further common microphone being connected to said internal structure; or the independent microphones are each respectively provided in the front and rear of the case and coupled to an internal voice conduction structure extending toward the front and rear, and a common horn is provided and also coupled to the internal voice conduction structure extending toward the front and rear of the case; or common horns are respectively provided in the front and rear of the case and coupled to an internal voice conduction structure extending toward the front and rear of the case, and a common microphone is provided and also coupled to the internal voice conduction structure extending toward the front and rear of the case;

common horns are respectively provided in the front and rear of the case and coupled to an internal voice conduction structure extending toward the front and rear of the case, and a common microphone is provided at a preselected location; or a common horn is respectively provided in the front and rear of the case and is coupled to the internal voice conduction structure extending toward the front and rear of the case, and one of said independent microphones is provided in the front or the rear of the case.

2. A voice interface structure as claimed in claim 1, within, its opposite structure is comprised of a keypad 4 and a display 5 provided in the front of the case of a cellular phone while a cell 102, a horn 2 and a microphone 3 are provided on the opposite side so to separate electromagnetic wave by means of the case and the cell of the cellular phone.

3. A voice interface structure as claimed in claim 1, wherein:

a hemispheric or C-shape or ring-shape voice conduction hood is provided on the side of the case of the cellular phone where the common horn is provided, at least one independent microphones is provided at a front or rear of the case, and a hemispheric or C-shape, or ring-shape voice conduction hood is also provided on a receiving side; or a hemispheric or C-shape or ring-shape voice conduction hood is provided on the side of the case where a common horn is provided, an independent microphone is provided at front or rear of the case, and a hemispheric or C-shape or ring-shape voice conduction hood is also provided on the receiving side; or the common horn is respectively provided in the front and rear of the case and is coupled to an internal voice conduction structure extending toward the front and rear of the case, the common microphone is provided and coupled to the internal voice conduction structure extending toward the front and rear of the case, and the hemispheric or C-shape or ring-shape voice conduction hood 6 is each provided and coupled to the internal voice conduction structure extending toward the front and rear of the case, and the hemispheric or C-shape or ring-shape voice conduction hood is provided on each of the receiving and transmission sides; or the independent horn is respectively provided either in the front or the rear of the case, and the hemispheric or C-shape or ring-shape voice conduction hood is provided on the transmission or receiving sides; or the independent horn and a microphone are both provided in either the front or the rear of the case, and a hemispheric or C-shape or ring-shape voice conduction hood is respectively provided in the rear of the case, or an independent horn is provided in the rear and a microphone is provided in the front of the case, while a hemispheric or C-shape, or ring-shape voice conduction hood each provided on the transmission and receiving sides.

4. A voice interface structure as claimed in claim 1, wherein a hemispheric or C-shape or ring-shape voice conduction hood is provided only on the side of the case of the cellular phone where a horn is provided, the side provided with a microphone includes no voice conduction hood.

5. A voice interface structure as claimed in claim 1, wherein a hemispheric or C-shape or ring-shape voice conduction hood is provided on one side of one of said microphones, at a lower end of the case, and the side provided with the horn includes no voice conduction hood.

6. A voice interface structure as claimed in claim 1, wherein hemispheric or C-shape or ring-shape voice conduction hood is provided on either side of the common horn provided at an upper end of the case and a side of the case where a common horn is provided includes no voice conduction hood.

7. A voice interface structure as claimed in one of claim 3, 4, 5, or 6, wherein at least one voice conduction pore is provided at a pre-selected transmission or receiving location on the voice conduction hood.

8. A voice interface structure as claimed in claim 1, wherein said phone is a cellular phone having a flip-cover.

* * * * *